(12) United States Patent
Kamiya

(10) Patent No.: US 6,903,844 B1
(45) Date of Patent: Jun. 7, 2005

(54) IMAGE FORMATION APPARATUS, IMAGE FORMATION APPARATUS CONTROL METHOD, AND STORAGE MEDIUM STORING COMPUTER-READABLE PROGRAM

(75) Inventor: Yuji Kamiya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,833

(22) Filed: May 18, 2000

(30) Foreign Application Priority Data

May 20, 1999 (JP) .......................................... 11-139622

(51) Int. Cl.$^7$ .......................... H04N 1/40; H04N 1/403; G06K 9/46; G06K 9/80; G06T 5/00
(52) U.S. Cl. ......................... 358/2.1; 358/462; 382/176; 382/205
(58) Field of Search .................................. 358/2.1, 3.24, 358/462, 453, 538, 536, 534, 1.9; 382/195.205, 176, 180, 171, 164, 173, 224, 300

(56) References Cited

U.S. PATENT DOCUMENTS

| | | | | |
|---|---|---|---|---|
| 3,805,239 A | * | 4/1974 | Watanabe | .................... 382/271 |
| 5,787,195 A | * | 7/1998 | Tsujimoto et al. | ........... 382/176 |
| 5,819,288 A | * | 10/1998 | De Bonet | ....................... 707/2 |
| 6,212,297 B1 | * | 4/2001 | Sklarew | ....................... 382/189 |
| 6,324,309 B1 | * | 11/2001 | Tokuyama et al. | ........... 382/300 |
| 6,388,768 B2 | * | 5/2002 | Hada et al. | .................... 358/1.9 |
| 6,453,074 B1 | * | 9/2002 | Zheng | .......................... 382/260 |
| 6,636,630 B1 | * | 10/2003 | Adachi et al. | ............... 382/176 |

FOREIGN PATENT DOCUMENTS

| | | | | |
|---|---|---|---|---|
| JP | 4248766 | * | 9/1992 | ............. H04N/1/40 |
| JP | 5145747 | * | 6/1993 | ............. H04N/1/40 |

* cited by examiner

*Primary Examiner*—Scott A. Rogers
(74) *Attorney, Agent, or Firm*—Fitzpatrick, Cella, Harper & Scinto

(57) ABSTRACT

There is disclosed the following constitution in order to accurately perform image area separation judgment by one pixel unit of a read image at a high speed and to form an image in which character sharpness is compatible with photograph gradation without generating a false outline in the boundary of character and photograph areas. For this purpose, a first calculation unit calculates the sum of absolute values of differences of image signals between a predetermined pixel in a predetermined two-dimensional area including one noticeable pixel in the read image and the peripheral pixel of the predetermined one pixel in the predetermined two-dimensional area, a second calculation unit calculates the sum of calculation results with respect to the respective pixels in the predetermined two-dimensional area, a judgment unit judges whether the one noticeable pixel is the pixel in the photograph area or the pixel in the character area, and the image processing, and image formation method are changed with respect to the noticeable pixel based on the judgment result.

15 Claims, 13 Drawing Sheets

FIG. 5A

|   | 1 | 2 | 3 | 4 | 5 | 6 | 7 |
|---|---|---|---|---|---|---|---|
| 1 | 0 | -2 | -5 | -6 | -5 | -2 | 0 |
| 2 | -2 | -7 | -6 | -2 | -6 | -7 | -2 |
| 3 | -5 | -6 | 17 | 39 | 17 | -6 | -5 |
| 4 | -6 | -2 | 39 | 72 | 39 | -2 | -6 |
| 5 | -5 | -6 | 17 | 39 | 17 | -6 | -5 |
| 6 | -2 | -7 | -6 | -2 | -6 | -7 | -2 |
| 7 | 0 | -2 | -5 | -6 | -5 | -2 | 0 |

FIG. 5B

|   | 1 | 2 | 3 | 4 | 5 | 6 | 7 |
|---|---|---|---|---|---|---|---|
| 1 | 1 | 2 | 3 | 5 | 3 | 2 | 1 |
| 2 | 2 | 3 | 6 | 8 | 6 | 3 | 2 |
| 3 | 3 | 6 | 9 | 12 | 9 | 6 | 3 |
| 4 | 5 | 8 | 12 | 16 | 12 | 8 | 5 |
| 5 | 3 | 6 | 9 | 12 | 9 | 6 | 3 |
| 6 | 2 | 3 | 6 | 8 | 6 | 3 | 2 |
| 7 | 1 | 2 | 3 | 5 | 3 | 2 | 1 |

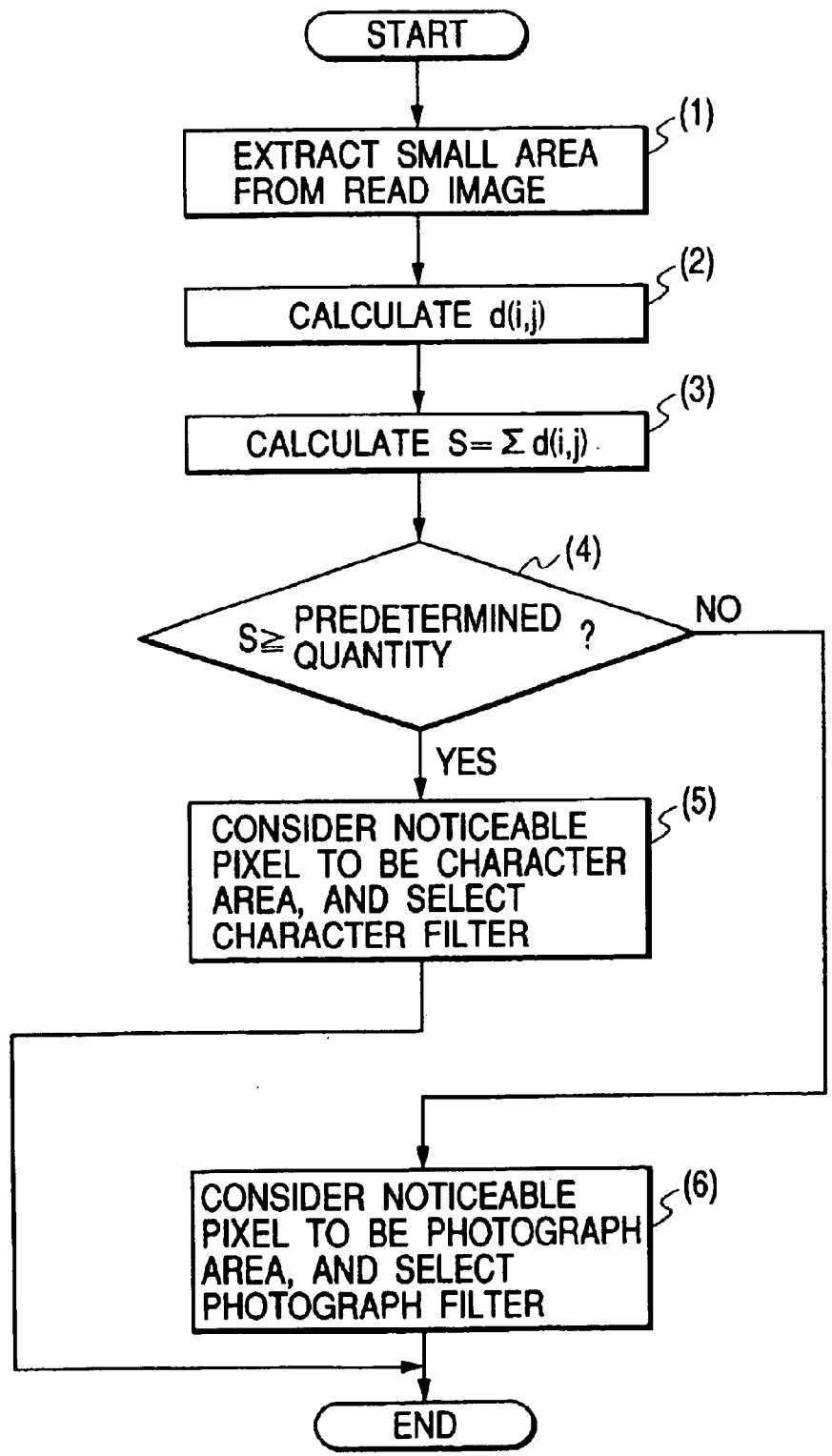

FIG. 13

IMAGE FORMATION APPARATUS, IMAGE FORMATION APPARATUS CONTROL METHOD, AND STORAGE MEDIUM STORING COMPUTER-READABLE PROGRAM

BACKGROUND OF THE INVENTION

1. Field of the Invention

The present invention relates to an image formation apparatus which performs the image area separation of a read image to provide character and photograph areas and forms an image based on the read image, an image formation apparatus control method, and a storage medium for storing a computer-readable program.

2. Description of Related Art

An image area separation method of judging, from an image signal in the predetermined area of a read image, whether the inside of the predetermined area is entirely a character area or a photograph area is present as a conventional art.

Moreover, as image area separation means of judging whether the predetermined area is a character area or a photograph area as described above, a method of performing a discrete Fourier transform in the predetermined area and perform judgment by the amount of frequency components is also known as the conventional art.

Furthermore, means for switching image formation means during image output with respect to the area subjected to the image area separation is also known as the conventional art.

An image separation judgment processing in the conventional image formation apparatus will concretely be described hereinafter with reference to FIGS. 15 and 16.

FIG. 15 is a schematic diagram showing a small area which is considered to be a character area or a photograph area in the conventional image formation apparatus, and the small area corresponds to a small area from which the image signal of 8 pixels×8 pixels is extracted in the read image.

The conventional image formation apparatus performs frequency conversion such as a fast Fourier transform (FFT) in the small area as shown in FIG. 15, and performs the image area separation to judge whether the small area is a character area or a photograph area.

FIGS. 16A and 16B are characteristic diagrams showing the frequency characteristic when the read image is subjected to the frequency conversion in the conventional image formation apparatus, FIG. 16A is a one-dimensional graph showing the frequency conversion result of a character image, and FIG. 16B is a one-dimensional graph showing the frequency conversion result of a photograph image. Additionally, in both FIGS. 16A and 16B, the abscissa indicates frequencies, and the ordinate indicates frequency components.

The conventional image formation apparatus judges that the area is a character area when the frequency component in the vicinity of the Nyquist frequency of reading resolution is high as shown in FIG. 16A, and judges that the area is a photograph area when the frequency component is low as shown in FIG. 16B. Additionally, the character area includes a mesh point image.

In the image area separation judgment method of the conventional image formation apparatus of judging, from the image signal in the predetermined area of the read image, whether the entire area shown in FIG. 15 is a character area or a photograph area, since the processing is performed by an area unit, there is no interaction between adjacent areas, and the judgment easily results in rapid area judgment.

For example, when the read image of 600 dpi×600 dpi (both the ordinate (Y direction of FIG. 15) and abscissa (X direction of FIG. 15) indicate 600 dpi) is subjected to the image area separation with the small area of 8 pixels×8 pixels as shown in FIG. 15, even the small area is considered to be a character area or a photograph area for each area of about 340 $\mu$m×340 $\mu$m.

However, when an output is emitted through the image formation apparatus, the size of 340 $\mu$m×340 $\mu$m (small area of (8×8) pixel unit shown in FIG. 15) can be confirmed with the naked eye as an apparent size. Actually the size of about several hundreds of micrometers can easily be distinguished with the naked eye, and the image change of this size is securely recognized as an unfavorable false outline or a nonuniformity.

Therefore, when the technique of switching the image formation means in the character area and photograph area based on the judgment result of the small area as shown in FIG. 15 is introduced, and when a difference is seen in the output characteristic between the areas, the unfavorable outline is recognized to such an extent that it is apparently visible with the naked eye.

This will concretely be described hereinafter with reference to FIGS. 17 and 18.

FIG. 17 is a schematic diagram showing the boundary between the character area and the photograph area when the image area separation is performed for each small area shown in FIG. 15 in the conventional image formation apparatus.

In FIG. 17, T denotes the character area, and P denotes the photograph area. Numeral 1401 denotes the boundary between the character area T and the photograph area P.

FIG. 18 is a schematic diagram showing the image formation result when the character area is adjacent to the photograph area and the image formation means is changed in the character and photograph areas in the conventional image formation apparatus, and the same components as those of FIG. 17 are denoted with the same reference numerals.

FIG. 18 shows the output result of the image formation apparatus in which toner is visualized as the image in a black part. In the character area T, black/white is clearly outputted to attach importance to sharpness rather than to gradation, and in the photograph area P, no steep density difference is made between black and white with due consideration to attach importance to gradation.

Therefore, when the image area is considered to be the mixture of the character area T and the photograph area P (FIG. 17), as shown in FIG. 18, in the character area T, the image formation is performed by attaching importance to the character sharpness, without laying any emphasis on the gradation. On the other hand, in the photograph area P the image formation is performed by laying emphasis on the gradation rather than the sharpness. As a result, the boundary 1401 between the character area T and the photograph area P becomes conspicuous, and there is a problem that the unfavorable images such as the false outline are formed.

In this case, when the difference of the image formation means is minimized between the character area and the photograph area, the result becomes satisfactory, but another problem occurs that it is difficult to set the sharpness demanded for the character to be compatible with the gradation demanded for the photograph.

Moreover, in the image formed by subtly combining the character area and photograph area, for example, in the character image on the photograph, the image is considered to be either the character area or the photograph area by the image area separation technique of the conventional image formation apparatus in which only two types of judgments can be performed in the predetermined area. Therefore, when the character image and photograph image are present in the small area as in the character image on the photograph, there is also a problem that the image of either the photograph or the character is sacrificed.

Furthermore, as the means of judging whether the predetermined area is the character area or the photograph area, in the conventional method of performing the discrete Fourier transform in the predetermined area and performing the judgment by the amount of the frequency component, a load of hardware or software is inevitably increased. This is because the discrete Fourier transform is relatively complicated as the calculation of the image signal.

Therefore, in the conventional image formation apparatus in which the discrete Fourier transform is performed in the above-described predetermined area and the judgment is performed by the amount of frequency components, consideration also needs to be given to processing speed, and there is also a problem that an expensive processor, and the like have to be mounted.

SUMMARY OF THE INVENTION

The present invention provides an image formation apparatus, an image formation apparatus control method, and a storage medium for storing a program readable by a computer to solve the above-described problems.

Other objects and characteristics of the present invention will be apparent from the following description and drawings.

BRIEF DESCRIPTION OF THE DRAWINGS

FIGS. 5A and 5B are schematic diagrams showing one example of a filter table showing the weight of a filtering processing in the image formation apparatus according to the embodiment of the present invention;

FIG. 6 is a flow chart showing one example of a first control processing of the image formation apparatus according to the embodiment of the present invention;

FIG. 13 is a schematic diagram showing the image formation result of a second predetermined area (submatrix) shown in FIG. 12 according to the image formation apparatus of the embodiment of the present invention;

DETAILED DESCRIPTION OF THE PREFERRED EMBODIMENTS

[First Embodiment]

Figure 1:
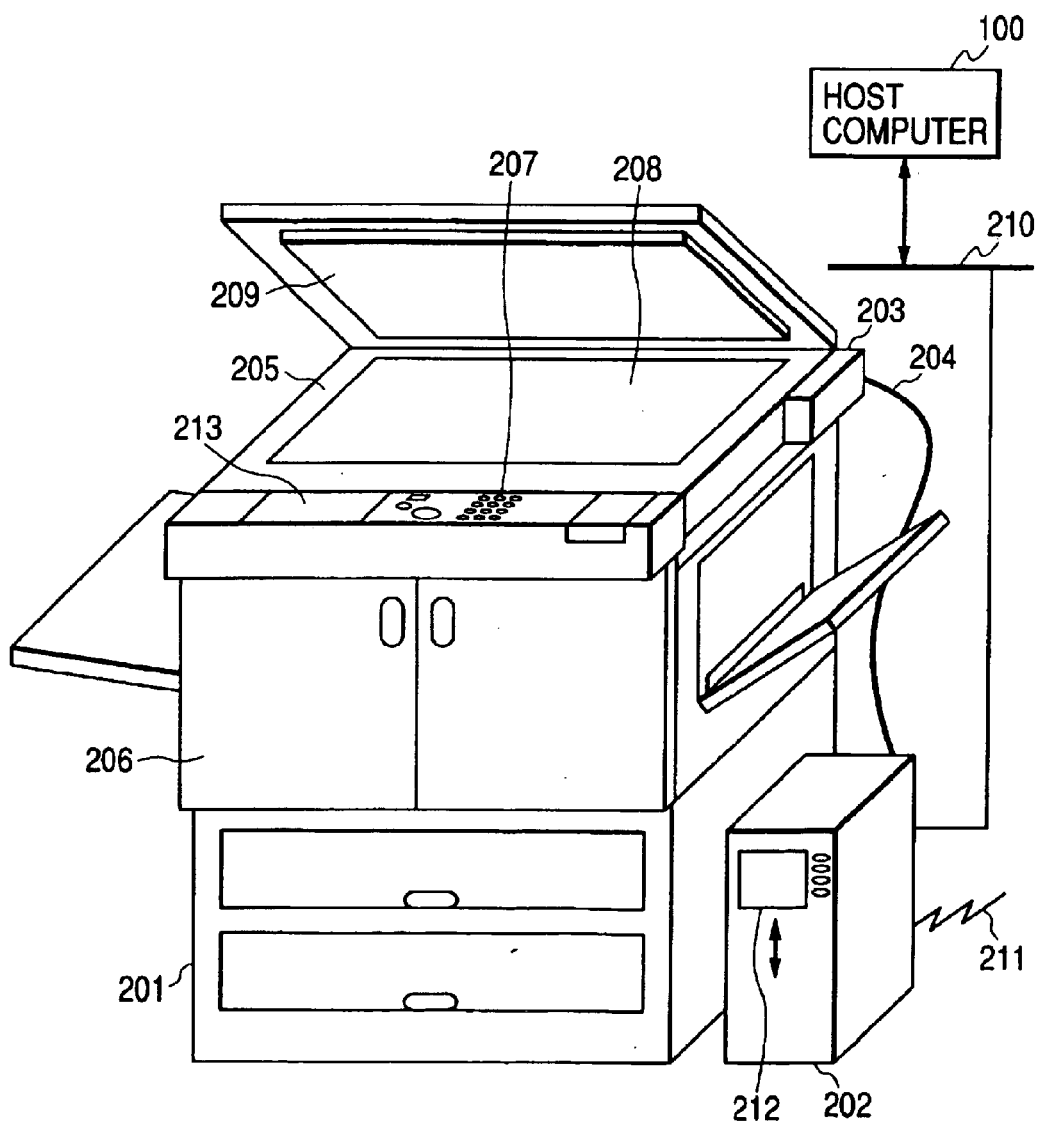
FIG. 1 is a perspective view of the constitution of an image formation apparatus showing a first embodiment of the present invention.

FIG. 1 is a perspective view of the constitution of an image formation apparatus showing a first embodiment of the present invention. Additionally, it is shown as one example of the image formation apparatus of the present invention that a copying machine provided with copying and printer functions is connected to a controller 202 able to transmit/receive the information such as image information to/from an external apparatus via a network, a public line 211, and the like, but the copying machine and controller may be constituted by one apparatus.

In FIG. 1, a copying machine 201 as an image formation apparatus is connected to the controller 202 via a video cable 204 which is connected to a video interface 203. This controller 202 is connected to a network 210 such as Ethernet or the public line 211, and can communicate with external apparatuses such as a host computer 100 and a scanner (not shown).

Moreover, the copying machine 201 is constituted of a scanner unit 205 and a printer unit (image formation unit) 206, the scanner unit 205 converts an original image to read image data, and the printer unit 205 is provided with various types of recording sheet cassettes for storing sheet materials such as recording sheets to output the image data outputted from the scanner unit 205 in response to a print command onto the recording sheet or another sheet material as a visualized image. A liquid crystal display (LCD) 212 is disposed on the controller 202, and can display various messages.

In the scanner unit 205, an operation unit 207 inputs a copy operation instruction and various settings of the copying machine 201. An LCD 213 is disposed on the operation unit 207, and can display various set values and various messages of the operation unit 207. An original stand 208 is formed of transparent glass. A pressing plate 209 presses an original laid on the original stand 208.

Moreover, in the scanner unit 205, an image reading mechanism (scanner) constituted of an original sensor (not shown) for detecting whether the original is laid on the original stand 208 or not, photoelectric conversion elements such as a CCD image sensor for reading the original image laid on the original stand 208, a motor, and the like is disposed in the lower part of the original stand 208.

The control constitution of the image formation apparatus shown in FIG. 1 will be described hereinafter with reference to FIG. 2.

Figure 2:
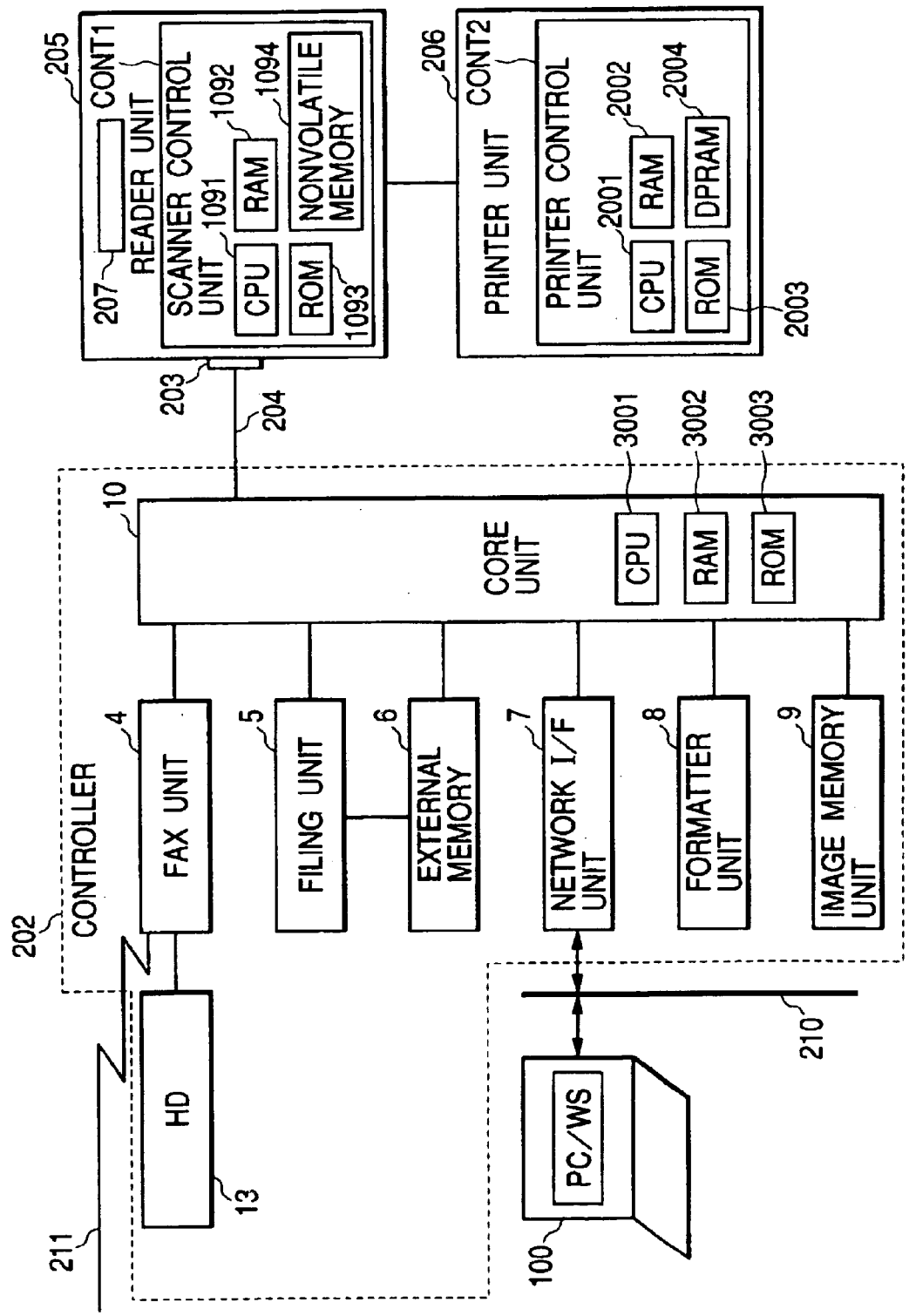
FIG. 2 is a block diagram showing the control constitution of the image formation apparatus shown in FIG. 1.

FIG. 2 is a block diagram showing the control constitution of the image formation apparatus shown in FIG. 1, and the same components as those of FIG. 1 are denoted with the same reference numerals.

In FIG. 2, the controller 202 is provided with: a facsimile (FAX) unit 4 for controlling the facsimile transmission/reception (or the communication with the information processing apparatus connected to the public line 211) via the predetermined public line 211 such as a telephone line; a hard disk (HD) 13; a filing unit 5; an external memory 6 connected to the filing unit 5; a network interface (I/F) unit 7 for connecting the external apparatuses such as the host computer 100 to the controller 202 via the network such as Ethernet (or directly); a formatter unit 8 for developing the print information described in a page description language transmitted from the host computer 100 into the image data of a bit map form for each page directly printable by the printer unit 206 (developing on an image memory unit 9) to form a visualized image; an image memory unit 9 for temporarily storing the information such as the original image data read by the scanner unit 205, or for temporarily storing the information such as the print information inputted from the host computer 100 and the image data developed by the formatter unit 8; a core unit 10 for controlling the above-described respective functions; and the like.

Moreover, the external memory 6 can store the information such as the original image data read by the scanner unit 205, the print information inputted from the host computer 100, and the image data developed by the formatter unit 8 as an electronic file, and the electronic file is managed by the filing unit 5.

Furthermore, the core unit 10 is constituted of a CPU 3001, RAM 3002, ROM 3003, and the like. The CPU 3001 generally controls the core unit 10 and controller 202 based on the control program stored in the ROM 3003 or a storage medium (not shown). The RAM 3002 is used as the work area, and the like of the CPU 3001. Additionally, the ROM 3003 also stores a threshold value for judging whether the small area described later is a character area or a photograph area.

Moreover, CONT 1 is a scanner controller disposed inside the scanner unit 205, and is constituted of: a CPU 1091; a RAM 1092; a ROM 1093; an analog/digital conversion and shading correction unit (A/D SH unit) for analog/digital converting (A/D conversion) the image data read by the photoelectric conversion element (not shown) and for correcting (shading correction) the strain caused by the sensitivity nonuniformity of the photoelectric conversion element and light quantity nonuniformity of a light source; an image processor (not shown) for subjecting the image data outputted from the A/D SH unit to a predetermined image processing; and the like. The CPU 1091 generally controls the entire scanner unit 205 based on the control program stored in the ROM 1093. The RAM 1092 is used as the work area, and the like of the CPU 1091. A nonvolatile memory 1094 saves various set values inputted from the operation unit 207.

Furthermore, CONT 2 is a printer controller disposed inside the printer unit 206, and is constituted of a CPU 2001, RAM 2002, ROM 2003, dual-port RAM (DPRAM) 2004, and the like. The CPU 2001 generally controls the entire printer unit 206 based on the control program stored in the ROM 2003. The RAM 2002 is used as the work area, and the like of the CPU 2001.

Additionally, the CPU 1091 of the scanner unit 205 communicates with the CPU 2001 of the printer unit 206 using communication means such as the dual port RAM (DPRAM) 2004 in the printer unit 206, and performs the transmission/reception of control command or control data.

As described in the paragraphs of the conventional art, since the image area separation to the character area or the photograph area is performed by the small area unit in the conventional art, there is not interaction between the adjacent areas, the judgment results in the rapid area determination, and the boundary between the character area and the photograph area becomes conspicuous. In the present embodiment, the small area including a noticeable pixel is considered as shown in FIG. 3, and it is judged in the constitution whether each noticeable pixel is a character area or a photograph area.

The image area separation judgment method of the image formation apparatus of the present embodiment will be described hereinafter with reference to FIGS. 3 and 4.

Figure 3:
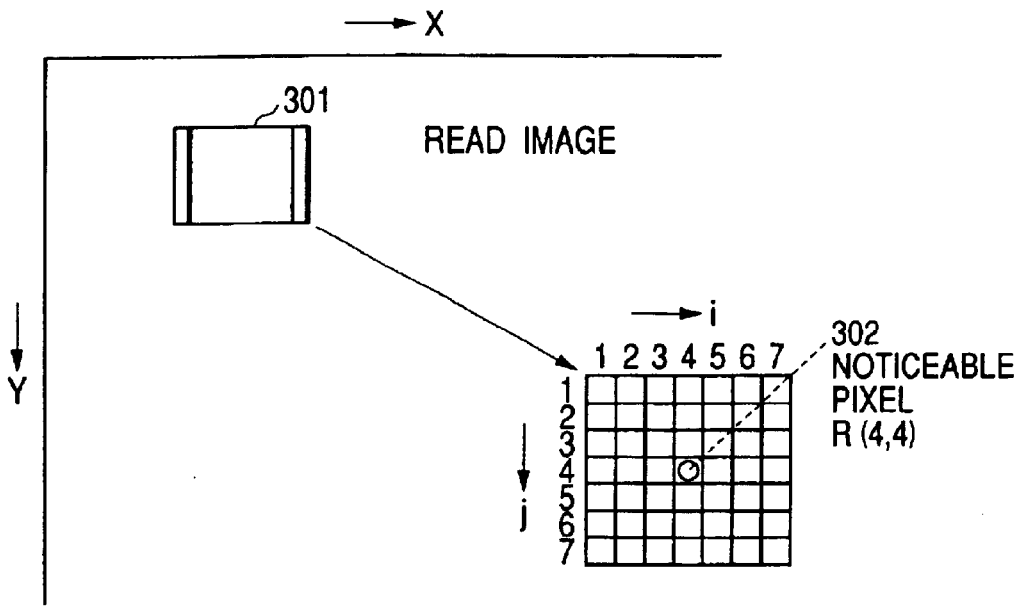
FIG. 3 is a diagram showing a small area for performing the image area separation of the image formation apparatus according to the embodiment of the present invention.

FIG. 3 is a diagram showing the small area for performing the image area separation of the image formation apparatus of the present embodiment.

In FIG. 3, a small area 301 for performing the image area separation judgment corresponds, for example, to a (7×7) pixel area. A noticeable pixel 302 is in the center of the small area 301, and is positioned in a place of i=4, j=4 on an ij coordinate in which one pixel of the small area 301 is used as one unit.

It is important here that the image signal of the (7×7) pixel small area be extracted only to judge whether one noticeable pixel is a character area or a photograph area. Specifically, with respect to the entire area of the read image, the image signal in the periphery of the small area is extracted and the image area separation judgment is performed by one pixel unit.

Additionally, the small area 301 for performing the image area separation judgment is not limited to the (7×7) pixel area, and may be an (M×N) pixel area (M, N are positive integers and M, N may be the same or different).

The image area separation judgment method of the small area 301 including the noticeable pixel 302 will be described hereinafter.

When the image signal in the small area 301 in the read image is $R(i, j)$, the image signal of the noticeable pixel is $R(4, 4)$. Additionally, i, j are integers of 1 to 7, respectively.

In this case, the absolute value of a difference from the image signals of adjacent pixels is considered, and a sum d1(i, j) is further obtained as follows (Equation 1):

$$d1(i, j) \equiv |R(i+1, j) - R(i, j)| + \quad (1)$$
$$|R(i-1, j) - R(i, j)| +$$
$$|R(i, j+1) - R(i, j)| +$$
$$|R(i, j-1) - R(i, j)|$$

The above equation is nothing but an equation for obtaining the sum of absolute positions of differences of an arbitrary point R(i, J) in the image area from upper, lower, left and right image signals. Furthermore, diagonal image signals with respect to the arbitrary point R(i, j) may be considered as follows (Equation 2):

$$d2(i, j) \equiv d1(i, j) + \quad (2)$$
$$|R(i+1, j+1) - R(i, j)| +$$
$$|R(i-1, j+1) - R(i, j)| +$$
$$|R(i-1, j+1) - R(i, j)| +$$
$$|R(i-1, j-1) - R(i, j)|$$

The image signals apart by about two pixels may be considered as follows (Equation 3):

$$d3(i, j) \equiv d2(i, j) + \quad (3)$$
$$|R(i-1, j+2) - R(i, j)| +$$
$$|R(i, j+2) - R(i, j)| +$$
$$|R(i+1, j+2) - R(i, j)| +$$
$$|R(i-1, j-2) - R(i, j)| +$$
$$|R(i, j-2) - R(i, j)| +$$
$$|R(i+1, j-2) - R(i, j)| +$$
$$|R(i+2, j-1) - R(i, j)| +$$
$$|R(i+2, j) - R(i, j)| +$$
$$|R(i+2, j+1) - R(i, j)| +$$
$$|R(i-2, j-1) - R(i, j)| +$$
$$|R(i-2, j) - R(i, j)| +$$
$$|R(i-2, j+1) - R(i, j)|$$

Furthermore, the image signals around the arbitrary point may be taken into consideration.

Alternatively, a weight may be added to each difference.

Additionally, when i+1, i+2, i−1, i−2 and j+1, j+2, j−1, j−2 are outside the small area, no difference needs to be obtained, and this also applies to the outside of the read image.

Subsequently, the sum of the differences of the image signals are calculated by the following equations (Equations 4, 5 and 6).

$$S1 \equiv \sum_{i=1}^{7} \sum_{j=1}^{7} d1(i, j) \quad (4)$$

$$S2 \equiv \sum_{i=1}^{7} \sum_{j=1}^{7} d2(i, j) \quad (5)$$

$$S3 \equiv \sum_{i=1}^{7} \sum_{j=1}^{7} d3(i, j) \quad (6)$$

Alternatively, an irregular sum may be obtained by taking d1(i, j), d3(i, j) into consideration and attaching importance to the vicinity of the noticeable pixel R(4, 4) as follows (Equation 7):

$$S4 \equiv \sum_{i=1}^{2} \sum_{j=1}^{7} d1(i, j) + \sum_{i=6}^{7} \sum_{j=1}^{7} d1(i, j) + \sum_{i=3}^{5} \sum_{j=1}^{2} d1(i, j) + \quad (7)$$
$$\sum_{i=3}^{5} \sum_{j=6}^{7} d1(i, j) + \sum_{i=3}^{5} \sum_{j=3}^{5} d1(i, j)$$

Figure 16A:
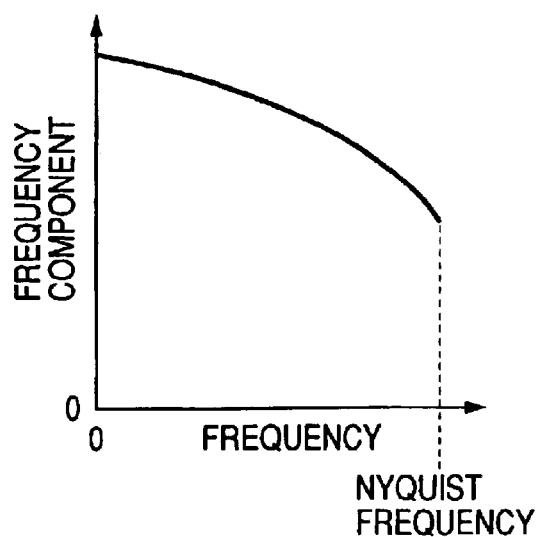
FIGS. 16A and 16B are characteristic diagrams showing a frequency characteristic when a read image is subjected to frequency conversion in the conventional image formation apparatus.
Figure 16B:
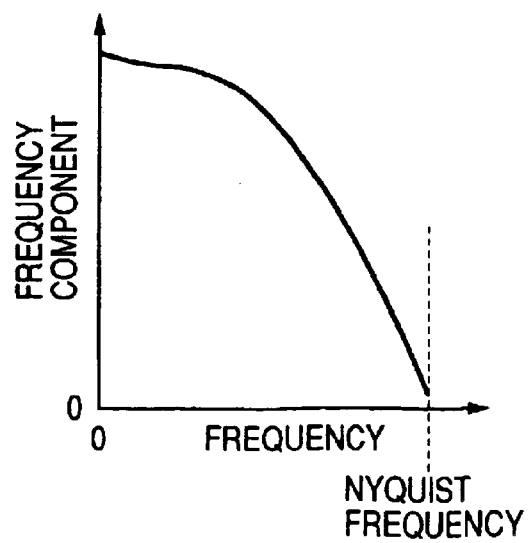
Figure 17:
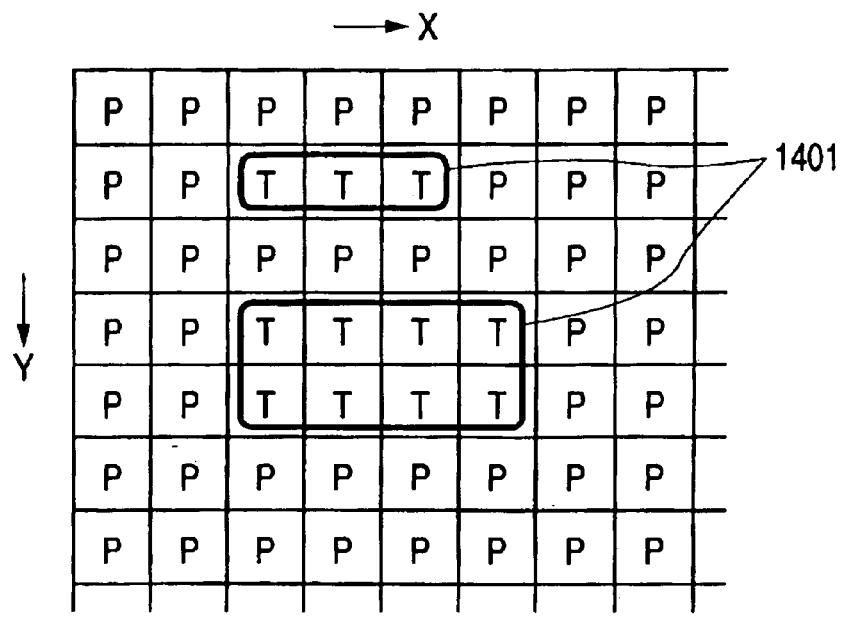
FIG. 17 is a schematic diagram showing the boundary between the character area and the photograph area when the image area separation is performed for each small area shown in FIG. 15 in the conventional image formation apparatus.
Figure 18:
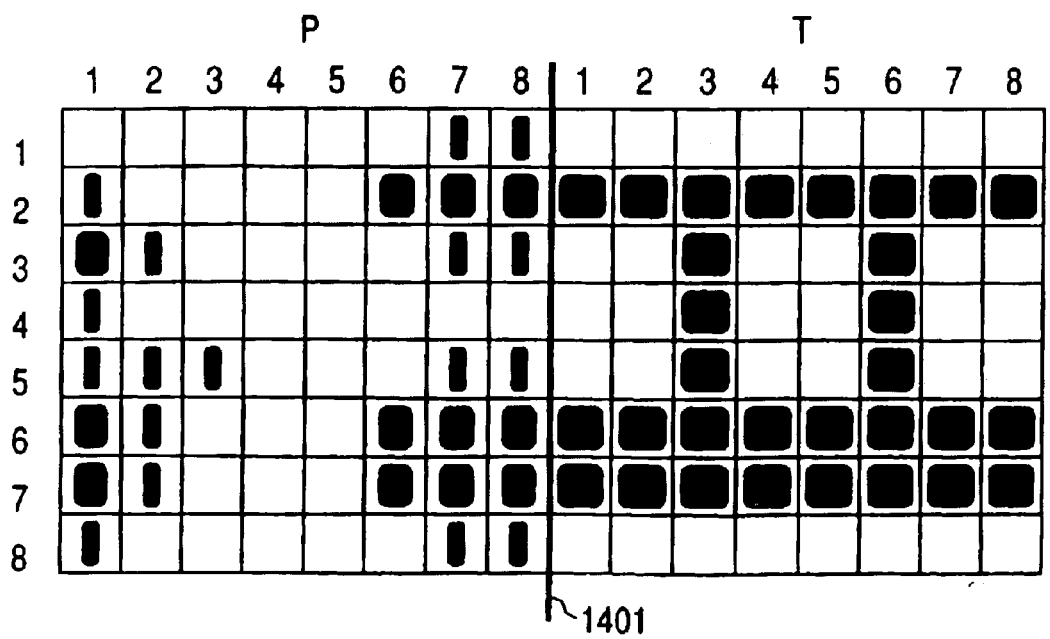
FIG. 18 is a schematic diagram showing the image formation result when the character area is adjacent to the photograph area and the image formation means is changed in the character and photograph areas in the conventional image formation apparatus.

Here, what is important is not the way of obtaining the sum, but that it is possible to obtain the sum of the differences of images S1 to S4 with a simple equation constituted of subtraction or addition, these S1 to S4 can be calculated at a speed higher than the speed of the calculation method of the frequency component by the high-speed frequency conversion such as a fast Fourier transform (FFT), and it is possible to easily obtain the value corresponding to the frequency component in the vicinity of Nyquist frequency shown in FIG. 16 of the conventional art.

Figure 4:
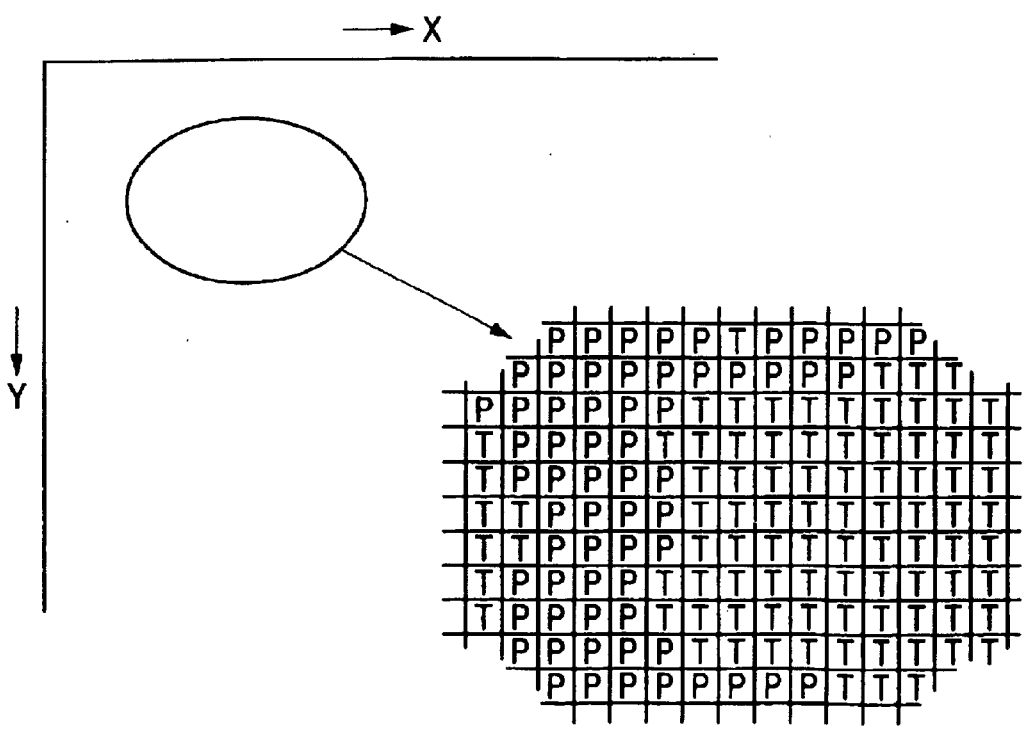
FIG. 4 is an explanatory view of an image area separation judgment result when the image area separation judgment is performed by one pixel unit in the image formation apparatus according to the embodiment of the present invention.

FIG. 4 is an explanatory view of an image area separation judgment result when the image area separation judgment is performed by one pixel unit in the image formation apparatus according to the present embodiment.

As described above, by noting one pixel of the small area 301 shown in FIG. 3 and performing the image area separation judgment by one pixel unit in the present embodiment, as shown in FIG. 4, for the area judgment result of the image signal, the character area T and the photograph area P can make a smooth change without including any boundary between the small areas.

FIGS. 5A and 5B are schematic diagrams showing one example of a filter table showing the weight of a filtering processing in the image formation apparatus according to the present embodiment, FIG. 5A shows the filter table to be used when the character area is judged by one pixel unit, and FIG. 5B shows the filter table to be used when the photograph area is judged by one pixel unit.

The filter table (hereinafter referred to as the filter) of FIGS. 5A and 5B shows the weight of the filtering processing for modulating the image signal of the noticeable pixel in accordance with the image area separation judgment result of the noticeable pixel when the read image is outputted by the image formation unit (printer unit 206), the convolution integrating with the arbitrary image in the predetermined area is executed, and the image processing is performed onto the noticeable pixel. Specifically, this filter defines the image processing based on the peripheral pixels with respect to the noticeable pixel.

Here, the filter size is set to be 7 pixels×7 pixels centering on the noticeable pixel in the same manner as the small area, but the same size is not particularly necessary, and the filter size may be larger or smaller than the size of the small area.

The respective numeric values in FIGS. 5A and 5B are values for weighing, and the filter of FIG. 5A to be used when the character area T is judged includes numeric values such that the signal of the noticeable pixel itself is considered to be more important than the peripheral image signals and the sharpness is extracted (the numeric value such that the image processing little influenced by the peripheral pixels is performed).

On the other hand, the filter of FIG. 5B to be used when the photograph area P is judged includes numeric values such that a strong influence is exerted from the peripheral image signals and emphasis is laid on the gradation (the numeric value such that the image processing largely influenced by the peripheral pixels is performed).

Specifically, when one noticeable pixel is considered to be the photograph area, the image signal of the noticeable pixel is modulated by attaching importance to the relation with the peripheral pixel signals (the filtering processing is performed by the filter shown in FIG. 5B). When one noticeable pixel is considered to be the character area, the image signal of the noticeable pixel is modulated by laying less stress on the relation with the peripheral pixel signal as compared with when the photograph area is judged (the filtering processing is performed by the filter shown in FIG. 5B).

As described above, the image formation apparatus of the present embodiment is provided with a plurality of filter tables as shown in FIGS. 5A and 5B, and the filter table is changed to perform the filtering processing in the character area T and photograph area P judged by one pixel unit.

The modulating operation of the output image signal in the image formation apparatus of the present embodiment will be described hereinafter with reference to FIG. 6.

FIG. 6 is a flow chart showing one example of a first control processing of the image formation apparatus according to the present embodiment, and shows the image area separation judgment processing and the modulation processing procedure of the output image signal in the image formation apparatus of the present embodiment, and the CPU 3001 of the core unit 10 shown in FIG. 2 executes the processing based on the program stored in the ROM 3003 or the storage medium (not shown). Additionally, (1) to (6) show respective steps.

First, the small area of 7 pixels×7 pixels is extracted from the image read by the scanner unit 205 shown in FIG. 1 (1). Subsequently, with respect to all arbitrary points P(i, j) in this small area, the sum d(i, J) of the image signal differences from the adjacent images (e.g., d1(i, j)) is calculated (2). Additionally, d2(i, j), d3(i, j), and the like may be calculated here instead of d1(i, J) as described above.

Subsequently, the sum of all signal differences in the small area is calculated as S (e.g., S1) (3). The sum S2, S3, S4 may also be calculated instead of S1 as described above.

It is judged whether or not the sum S (e.g., S4) of the image signal differences in the small area is equal to or more than a predetermined quantity (the threshold value stored in the ROM 3003) (4). When S is judged to be equal to or more than the predetermined quantity, one noticeable pixel is considered to be the character area, the character filter as shown in FIG. 5A is used to modulate the image signal of one noticeable pixel (perform the filtering processing), and the image is outputted by the image formation unit (printer unit 206) (5).

On the other hand, when the sum S of the image signal differences in the small area is not equal to or more than the predetermined quantity (less than the predetermined quantity) in the step (4), one noticeable pixel is considered to be the photograph area, the photograph filter as shown in FIG. 5B is used to modulate the image signal of one noticeable pixel (perform the filtering processing), and the image is outputted by the image formation unit (printer unit 206) (6).

Additionally, the above-described predetermined quantity, that is, the threshold value for judging whether the small area is the character area or the photograph area may be constituted by reading the predetermined character and photograph images from the reader unit 205, respectively, extracting the predetermined small area from the read image, calculating the sum S of all signal differences in the small area with respect to the character and photograph images, respectively, calculating the predetermined quantity based on the respective calculation results, and storing the quantity in the nonvolatile memory in the RAM 3002 or other storage media for use.

The characteristics of the image area separation judgment processing and image formation result according to the present embodiment are shown in the following Table 1. Additionally, in following Table 1, the image formation result obtained when the image area separation is performed on each small area in the conventional art is used as a comparison object.

TABLE

| | Conventional Art | Present Embodiment |
|---|---|---|
| Method | Frequency change in small area | Judgment from sum of image signal differences of adjacent pixels in small area |
| Calculation time to judgment | Complicated and time-consuming | Only with noticeable pixel, simple and short period, and even when each pixel is judged, high speed |
| Image quality after image formation | Small area boundary is conspicuous | Boundary is inconspicuous in one pixel unit |
| Mixed image of photograph and character | Incorrect judgment is caused, and offensive sight | Even incorrect judgment is inconspicuous in one pixel unit |

As shown in the table, since the image area separation judgment is performed from the sum of image signal differences of adjacent images in the present embodiment, as compared with the conventional example, the calculation algorithm is very simple and a high-speed processing can be realized. Therefore, even when each pixel is judged, a high-speed calculation processing is still possible.

Therefore, even in the image quality after the image formation, as compared with the conventional example in which the boundary resulting from the image area separation in the small area unit is conspicuous, in the present embodiment, since the image area separation judgment is performed by one pixel unit, the boundary resulting from the image area separation is difficult to confirm with the naked eye and inconspicuous.

Similarly, when the mixed image of the photograph and character is outputted, different from the conventional example in which only two ways of judgment of the character and photograph can be performed in the small area, in the present embodiment in which the character or the photograph is judged by one pixel unit and the smooth and accurate image area separation is possible, even the incorrect judgment is inconspicuous. Additionally, since the multi-stage judgment is possible in a macro manner, even the mixture of the photograph and character can be outputted without any problem.

Additionally, as the method of calculating the image signal difference between the adjacent images (e.g., d1(i, j)), in the execution for each small area, the same calculation needs to be repeated many times. Therefore, when the calculation is performed once, the result is then stored in storage devices such as a memory (RAM 3002), and the result is subsequently drawn from the storage device and used (the image signal difference processing of adjacent images following the image area separation during the shift of the noticeable pixel is omitted, and the just calculated result stored in the storage device is drawn and used), a higher-speed processing is possible.

Moreover, in the present embodiment the image area separation results in two-stage judgments of the character area and photograph area, but three or more stages of judgments may be made by introducing an intermediate area. Furthermore, by disposing three or more stages of filters, a finer handling is possible. In this case, a plurality of predetermined quantities, that is, threshold values for judging whether the small area is the character area or the photograph area are prepared in accordance with the number of stages and stored in the ROM 3003, and the like.

[Second Embodiment]

In the first embodiment, when the image is outputted by the image formation unit (printer unit 206) with respect to the read image, two types of filters are prepared so that the image area separation is judged from the image signal of the read image by the pixel unit and the influence degree of the peripheral pixels of the noticeable pixel can be changed based on the judgment result, and the two types of filters are changed based on the judgment result of the image area separation. However, the constitution may comprise selectively using two types of conversion equations to change the image signal of the noticeable pixel based on the judgment result of the image area separation, so that the sharpness of the character image is further enhanced. The embodiment will be described hereinafter.

Here, in the present embodiment, the image signal of the noticeable pixel is of 8 bits, 256 levels, and two types of 256 level value conversion tables (hereinafter referred to as the gamma table) for establishing a one-to-one correspondence with the signal are prepared for the character area and photograph area.

Figure 7A:
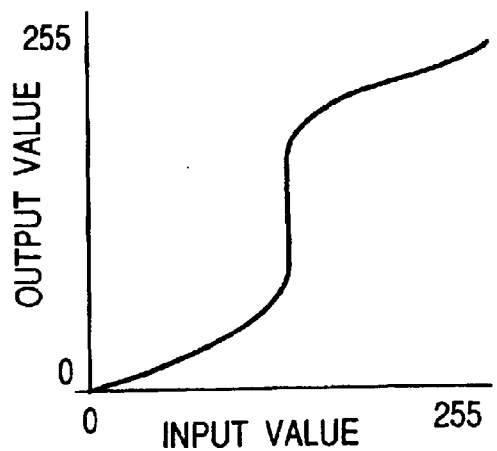
FIGS. 7A and 7B are characteristic diagrams showing a gamma table of a gamma conversion processing in the image formation apparatus according to the embodiment of the present invention.
Figure 7B:
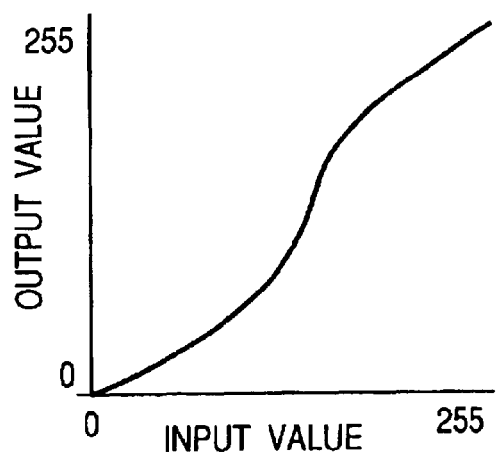

FIGS. 7A and 7B are characteristic diagrams showing the gamma table of a gamma conversion processing in the image formation apparatus of the present embodiment, FIG. 7A shows a correlation diagram showing the gamma table in a graph when one pixel unit is considered to be the character area, and FIG. 7B shows a correlation diagram showing the gamma table in a graph when one pixel unit is considered to be the photograph area. Additionally, both in FIGS. 7A and 7B, the abscissa indicates an input value, and the ordinate indicates an output value.

Figure 8A:
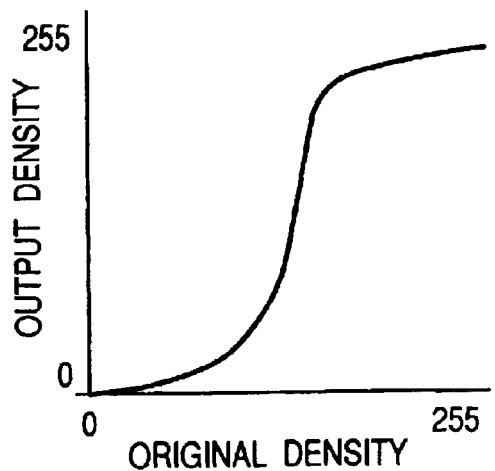
FIGS. 8A and 8B are characteristic diagrams showing a target curve of a read image density and output image density of the image formation apparatus according to the embodiment of the present invention.
Figure 8B:
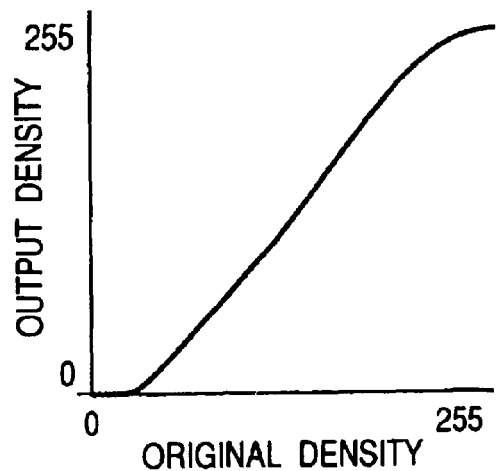

FIGS. 8A and 8B are characteristic diagrams showing a target curve of a read image density and output image density of the image formation apparatus according to the present embodiment, FIG. 8A shows a correlation diagram showing the target curve in a graph when one pixel unit is considered to be the character area, and FIG. 8B shows a correlation diagram showing the target curve in a graph when one pixel unit is considered to be the photograph area. Additionally, both in FIGS. 8A and 8B, the abscissa indicates an original density, and the ordinate indicates an output density.

The gamma tables shown in FIGS. 7A and 7B are determined in the design stage of the image formation apparatus, and are actually derived to obtain the target curve of the output image density with respect to the read image density as shown in FIGS. 8A and 8B.

Therefore, from the judgment result of the image area separation by each pixel unit in the present embodiment, the gamma table is used for each pixel unit, modulation (gamma conversion) is added to the output image density shown in FIGS. 8A and 8B, and a linear image shading is represented such that the emphasis of the density is added to the character image to increase the sharpness and the gradation is maintained in the photograph image.

The modulating operation of the output image signal in the image formation apparatus of the present embodiment will be described hereinafter with reference to FIG. 9.

Figure 9:
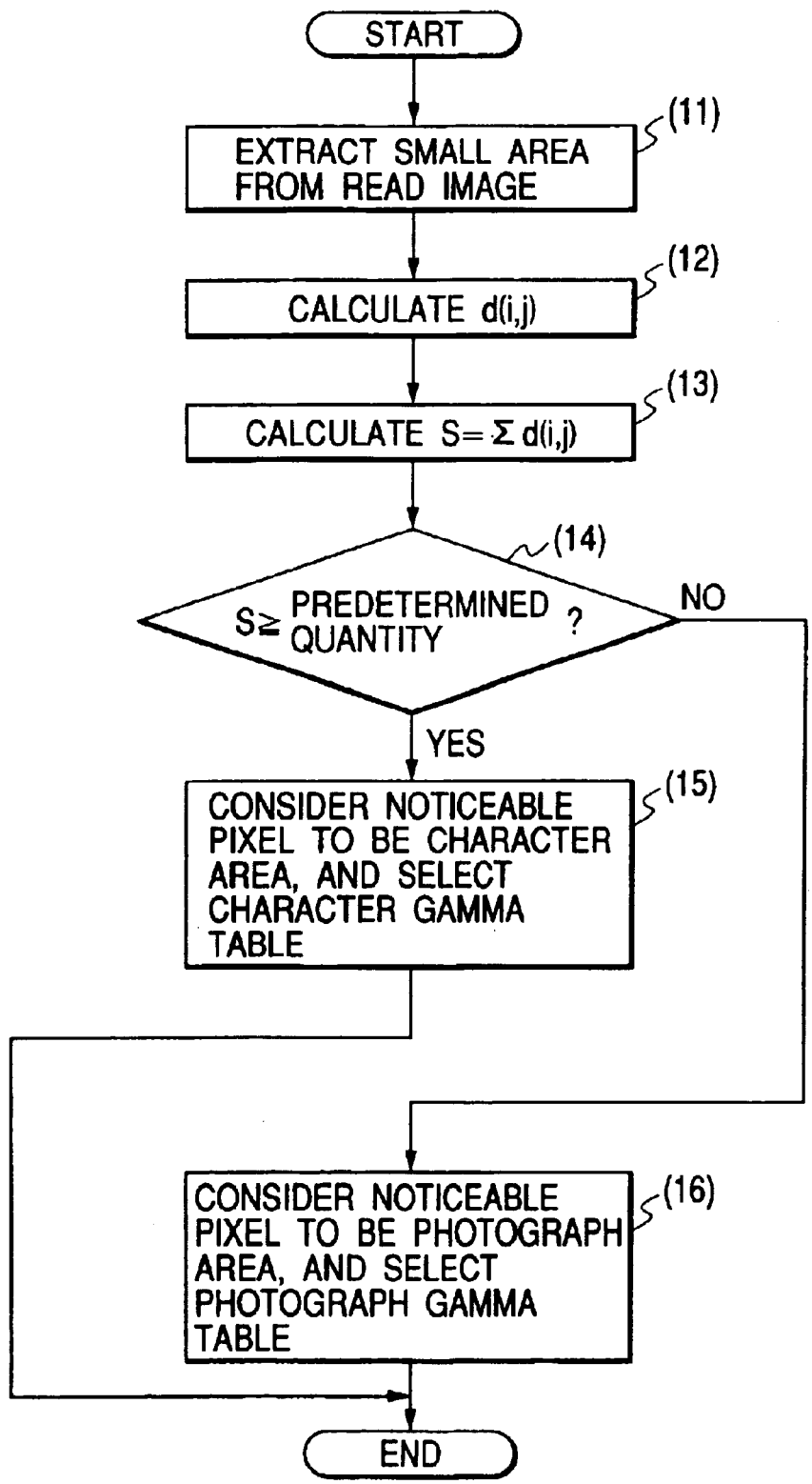
FIG. 9 is a flow chart showing one example of a second control processing of the image formation apparatus according to the embodiment of the present invention.

FIG. 9 is a flow chart showing one example of a second control processing of the image formation apparatus according to the present embodiment, and shows the image area separation judgment processing and the modulation processing procedure of the output image signal in the image formation apparatus of the present embodiment, and the CPU 3001 of the core unit 10 shown in FIG. 2 executes the processing based on the program stored in the ROM 3003 or the storage medium (not shown). Additionally, (11) to (16) show respective steps. Moreover, since the steps (11) to (14) are the same as the steps (1) to (4) of FIG. 6, the description thereof is omitted.

When the sum S (e.g., S4) of the image signal differences in the small area is equal to or more than the predetermined quantity (the threshold value stored in the ROM 3003) in the step (14), one noticeable pixel is considered to be the character area, the character gamma table as shown in FIG. 7A is used to perform modulation such that the output image density of one noticeable pixel is emphasized and to obtain the output signal provided with an increased sharpness (perform the gamma conversion processing), and the image is outputted by the image formation unit (printer unit 206) (15).

On the other hand, when the sum S of the image signal differences in the small area is not equal to or more than the predetermined quantity (less than the predetermined quantity) in the step (14), one noticeable pixel is considered to be the photograph area, the photograph gamma table as shown in FIG. 7B is used to perform modulation with respect to the output image density of one noticeable pixel so that the gradation is maintained and to obtain the output signal provided with a linear image density (perform the gamma conversion processing), and the image is outputted by the image formation unit (printer unit 206) (16).

As described above, in the present embodiment, by selecting the gamma table in accordance with the judgment result of the image area separation by one pixel unit, the properties of the character and photograph can further be individualized for the image output.

Additionally, it is easy to use the present embodiment (the change-over of a plurality of gamma tables) after executing a plurality of filtering processings as described in the first embodiment, so that the image formation of the character and photograph can further be characterized and outputted.

As described above, it is possible to distinguish the character area from the photograph area by a remarkably simple calculation as compared with the conventional art. Specifically, the simple and high-speed judgment is possible by the algorithm constituted only of simple arithmetic processings such as subtraction and addition, without using the arithmetic processing to which applied are processor loads such as a product and a quotient and other loads in hardware.

Moreover, since each noticeable pixel is regarded as one area, and the character area or the photograph area is judged by one pixel unit in the algorithm, the conventional unpleasant outline can be prevented from being generated by the collective Judgment of the entire inside of the predetermined area, and the conventional incorrect judgment of the image area separation can also be prevented from being generated by only two types of judgments in the predetermined area.

[Third Embodiment]

In the above-described first and second embodiments, as the result of the image area separation for each noticeable pixel of one pixel unit, the filter table or the gamma table is selected depending on the character area or the photograph area, so that the sharpness is held in the character area and the gradation is held in the photograph area, but the sharpness of the character area and the gradation of the photograph area may further be enhanced by changing (switching) the writing method (image formation method) in the image formation apparatus depending on the character area or the photograph area. The embodiment will be described hereinafter.

Figure 10:
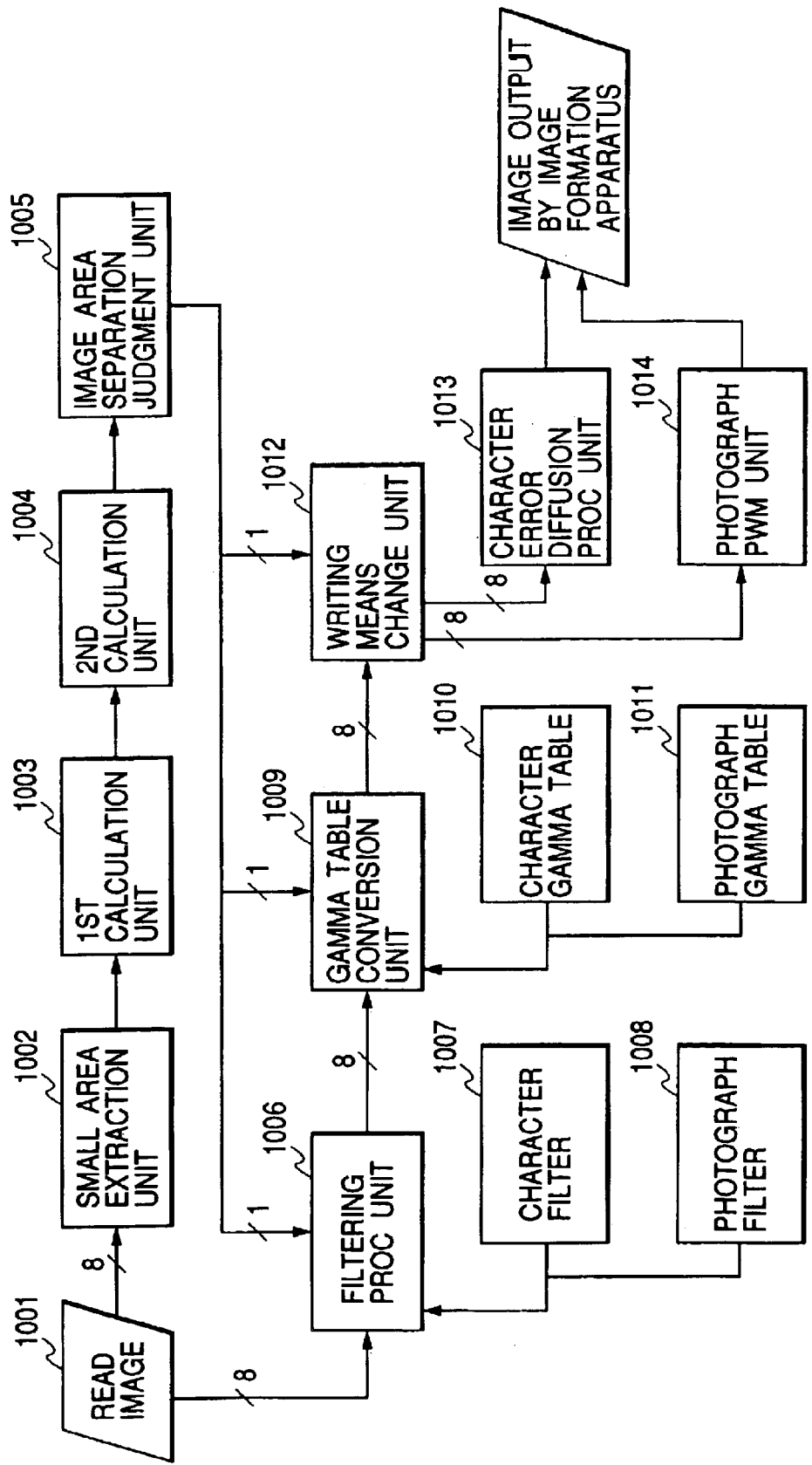
FIG. 10 is a block diagram showing the image formation constitution of the image formation apparatus according to a third embodiment of the present invention.

FIG. 10 is a block diagram showing the image formation constitution of the image formation apparatus according to a third embodiment, and particularly shows a writing processing (image formation processing) by the image formation unit (printer unit 206) after the image area separation of the read image and the filtering processing or the gamma conversion processing in accordance with the image area separation result described in the first and second embodiments.

In FIG. 10, a small area extraction unit 1002 extracts the small area including the noticeable pixel from a read image 1001. A first calculation unit 1003 calculates the difference (e.g., d1(i, j)) of the noticeable pixel in the small area extracted by the small area extraction unit 1002 from the adjacent pixel.

A second calculation unit 1004 calculates the sum of differences of the noticeable pixel from the adjacent pixels calculated by the first calculation unit 1003. An image area separation judgment unit 1005 judges whether one noticeable pixel is the character area or the photograph area based on the sum of the differences of the noticeable pixel from the adjacent pixels calculated by the second calculation unit 1004.

A filtering processing unit 1006 executes the filtering processing described in the first embodiment from the judgment result of the image area separation by the judgment unit 1005, selects a character filter 1007 (FIG. 5A) when one noticeable pixel is the character area, and selects a photograph filter 1008 (FIG. 5B) for the photograph area.

A gamma table conversion unit 1009 executes the gamma table conversion processing described in the second embodiment from the judgment result of the image area separation by the judgment unit 1005, uses a character gamma table 1010 (FIG. 7A) when one noticeable pixel is the character area, and uses a photograph gamma table 1011 (FIG. 7B) for the photograph area.

A writing means change unit 1012 performs a binarizing processing in a character error diffusion processing unit 1013 prepared for the character when one noticeable pixel is the character area as the judgment result of the image area separation by the judgment unit 1005, and executes the image output by the image formation unit (printer unit 206) (the image formation is performed so that the error of the noticeable pixel density and image formation density in the printer unit 206 is diffused to the peripheral pixel of the noticeable pixel).

On the other hand, when one noticeable pixel is the photograph area, a pulse width output of 256 gradations per pixel is applied by a pulse width modulation (PWM) unit 1014 prepared for photographs, and the image output is performed by the image formation apparatus (image formation unit (printer unit 102)) (the image is formed so that the shading representation is performed in one pixel).

Specifically, when one noticeable pixel is the character area, and when the noticeable pixel is, for example, monochromatic, the image is formed and represented in white or black. On the other hand, when one noticeable pixel is the photograph area, and when one noticeable pixel is, for example, monochromatic, the image is formed to represent the density of 250 gradations from white to black.

The output image outputting operation in the image formation apparatus of the present embodiment will be described hereinafter with reference to FIG. 11.

Figure 11:
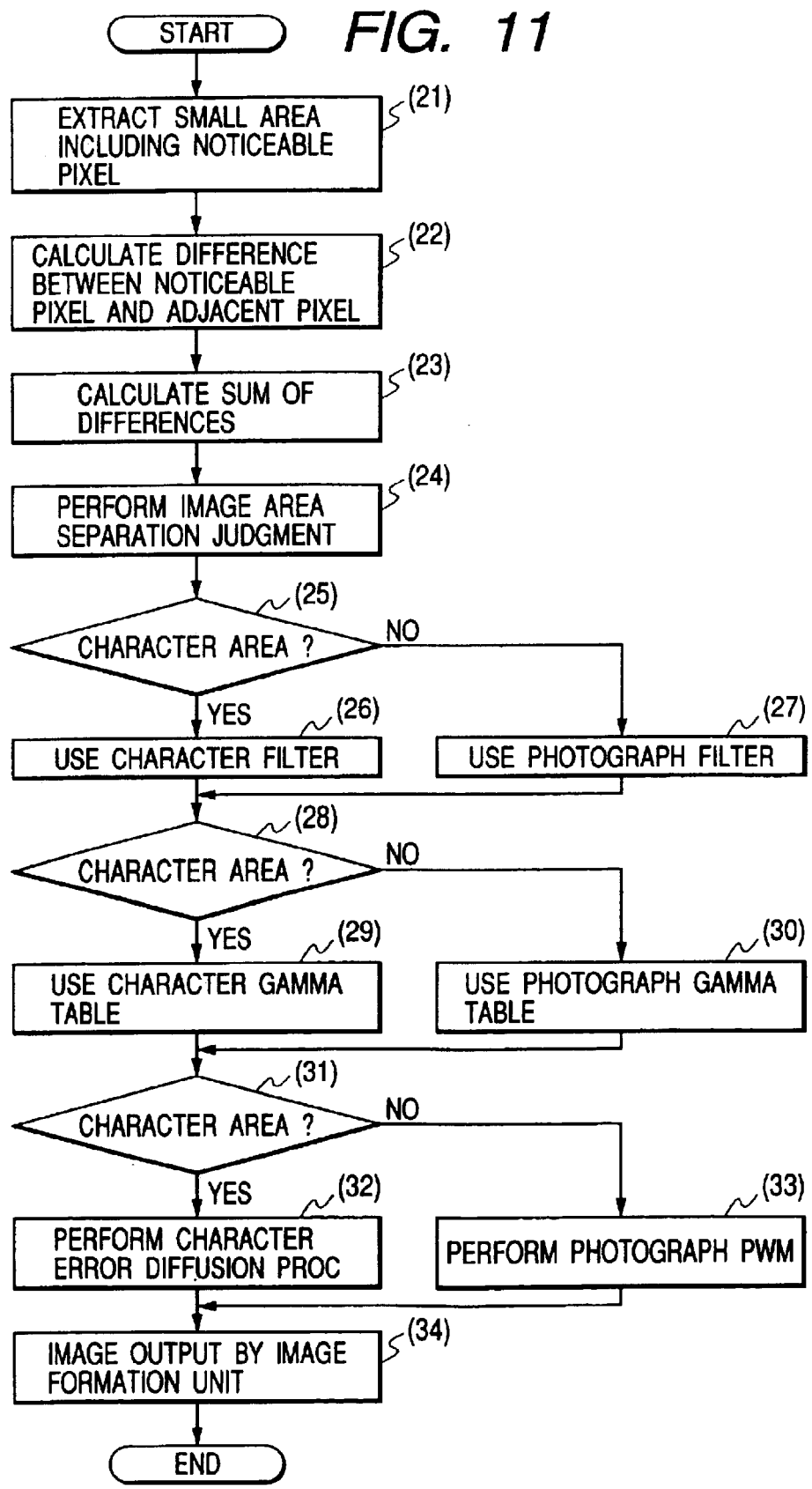
FIG. 11 is a flow chart showing one example of a third control processing of the image formation apparatus according to the embodiment of the present invention.

FIG. 11 is a flow chart showing one example of a third control processing of the image formation apparatus according to the present embodiment, and shows the image area separation judgment processing and the predetermined procedure of the output image in the image formation apparatus of the present embodiment, and the CPU 3001 (CPU 2001) of the core unit 10 shown in FIG. 2 executes the processing based on the program stored in the ROM 3003 (ROM 2003) or the storage medium (not shown). Additionally, (21) to (34) show respective steps.

First, the small area extraction unit 1002 extracts the small area including the noticeable pixel from the read image 1001 (21), the first calculation unit 1003 (or the CPU 3001) calculates the difference between the noticeable pixel and the adjacent pixel (22), the second calculation unit 1004 (or the CPU 3001) calculates the sum of differences between the noticeable pixel and the adjacent pixel (23), and the judgment unit 1005 (or the CPU 3001) then judges whether one noticeable pixel is the character area or the photograph area (performs the image area separation judgment) based on the sum of the differences of the noticeable pixel from the adjacent pixel calculated by the second calculation unit 1004 (24).

Subsequently, when one noticeable pixel is considered to be the character area as the image area separation result of the judgment unit 1005, the filtering processing unit 1006 (or the CPU 3001) uses the character filter (FIG. 5A) to perform the filtering processing (25), (26). When one noticeable pixel is considered to be the photograph area, the photograph filter (FIG. 5B) is used to perform the filtering processing (25), (27).

Moreover, when one noticeable pixel is considered to be the character area as the image area separation result of the judgment unit 1005, the gamma table conversion unit 1009 (or the CPU 3001) uses the character gamma table (FIG. 7A) to perform the gamma conversion processing (28), (29). When one noticeable pixel is considered to be the photograph area, the photograph gamma table (FIG. 7B) is used to perform the gamma conversion processing (28), (30).

Furthermore, when one noticeable pixel is considered to be the character area as the image area separation result of the judgment unit 1005, the writing means change unit 1012 (or the CPU 2001) performs the binarizing processing (31), (32). When one noticeable pixel is considered to be the photograph area, the photograph pulse width modulation unit 1014 (or the CPU 2001) performs the modulation processing on the pulse width of 256 gradations per pixel (31), (33), and the image formation unit (printer unit 206) performs the image output (34).

As described above, in the present embodiment, by changing the writing method (image formation method) in the image formation unit (printer unit 206) in accordance with the image area separation judgment result obtained by one pixel unit, the sharpness of the character image and the gradation of the photograph image can further be represented.

[Fourth Embodiment]

In the above-described third embodiment, the image area separation is judged from the image signal of the read image by the pixel unit, and the writing method (image formation method) in the image formation unit (image formation method) is modulated depending on the character area or the photograph area as the judgment result, but when all the pixels in the predetermined area are photograph areas as the judgment result of the image area separation of the pixel unit from the image signal of the read image, the writing means change unit 1012 (or the CPU 2001) may change the image formation processing in the image formation unit so that the image formation is performed using the predetermined number of pixels in the predetermined area as one unit, and the quality of the photograph image can further be enhanced. This embodiment will be described hereinafter.

Figures 12, 14:
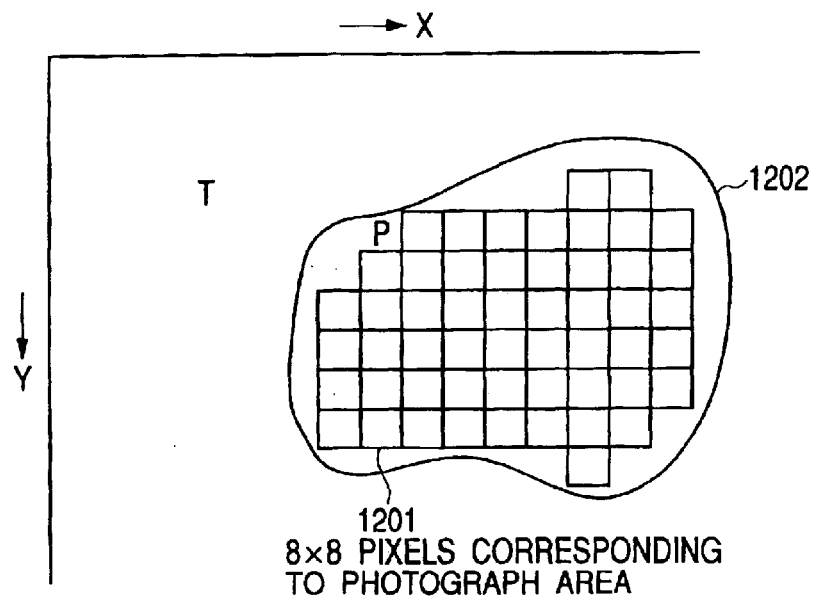
FIG. 12 is a diagram showing a range in which all 8 pixels×8 pixels correspond to a photograph area after the image area separation of the pixel unit in the image formation apparatus according to the embodiment of the present invention.
FIG. 14 is an explanatory view of the memory map of a storage medium for storing various data processing programs readable by an information processing apparatus according to the embodiment of the present invention.
Figure 15:
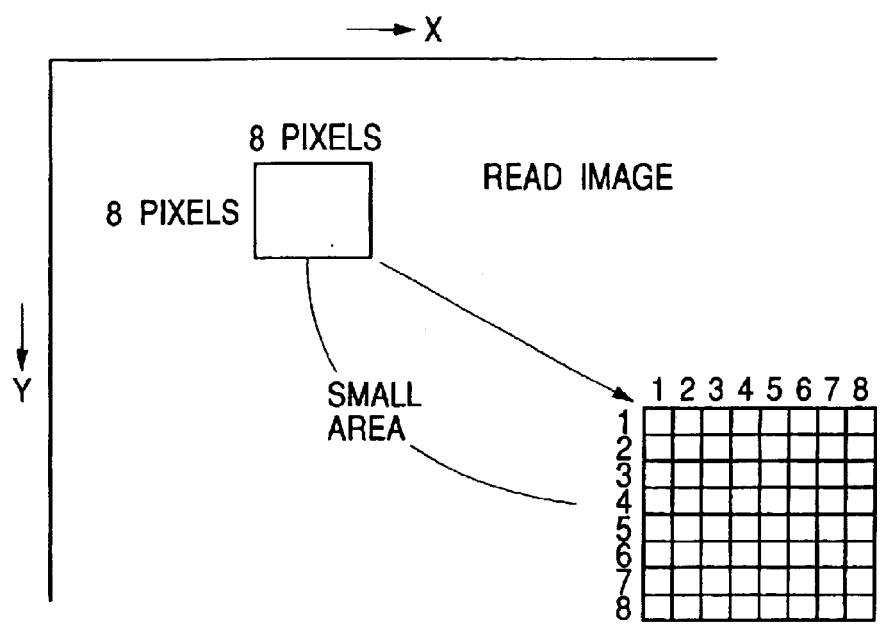
FIG. 15 is a schematic diagram showing a small area which is considered to be a character area or a photograph area in a conventional image formation apparatus.

FIG. 12 is a diagram showing a range in which all 8 pixels×8 pixels correspond to the photograph area after the image area separation of the pixel unit in the image formation apparatus according to the present embodiment.

In FIG. 12, a second predetermined area (sub-matrix) 1201 is constituted, for example, of 8 photograph pixels×8 photograph pixels. Moreover, an area 1202 is constituted of the second predetermined area (sub-matrix) 1201.

Additionally, the area 1202 constituted of the second predetermined area (sub-matrix) 1201 is detected by the CPU 3001 or the CPU 2001 shown in FIG. 2.

The basic resolution of the image formation apparatus according to the present embodiment is 600 dpi×600 dpi, but the lateral direction is provided with a resolution of 2400 dpi by adjusting a writing timing.

Moreover, in the image formation apparatus of the present embodiment, the resolution is set to be a size of lateral 2400 dpi×longitudinal 600 dpi. Since there are two values of the presence and absence of the image in the image formation apparatus, one pixel can usually be provided with four levels of gradation.

According to the image formation apparatus, 256 gradations can be reproduced with 8 pixels×8 pixels (second predetermined area).

Figure 13:
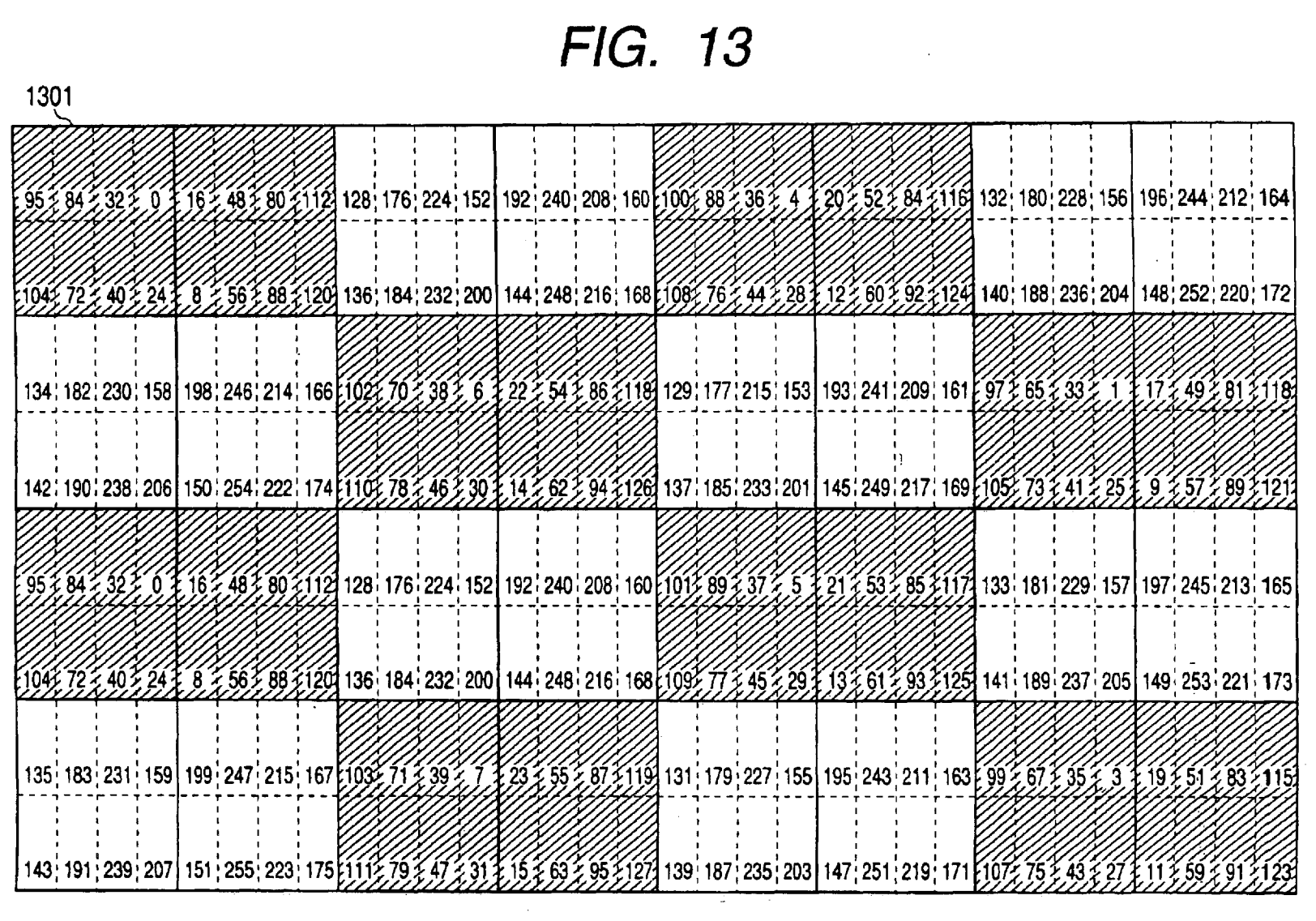

FIG. 13 is a schematic diagram showing the image formation result of the second predetermined area (sub-matrix) 1201 shown in FIG. 12 according to the image formation apparatus of the present embodiment.

In FIG. 13, numeral 1301 denotes a frame (¼ pixel frame) of 2400 dpi×600 dpi obtained by dividing one pixel into four, the numeric value shown in the ¼ pixel frame 1301 shows the order in a dither method for gradation representation with respect to the ¼ pixel frame 1301, and the ¼ pixel frame 1301 is graded by determining the presence/absence of the image in accordance with the order shown by the numeric value.

For example, when the writing image signal of the (8×8) pixel sub-matrix is "080H" ("128" in decimal notation), the image rides on the ¼ pixel frame in which the numeric value is less than 128, and no image rides when the value indicates 128 or more.

When all the pixels of the predetermined area are the photograph area as the judgment result of the image area separation of the pixel unit from the image signal of the read image as described above, the writing means change unit 1012 (or the CPU 2001) changes the image formation processing (i.e., image formation means) in the image formation unit (printer unit 206) so that the image formation is performed using the predetermined number of pixels in the predetermined area as one unit, and the area representation is possible as shown in the dark part of FIG. 13.

This ordering includes eight growth points, and the gradation representation is performed so that the image rides around the growth point. Therefore, the area gradation representation is possible, the stability against an image quality variation factor by the image formation apparatus is high, and a superior gradation representation is provided.

When the sub-matrix is formed by 8 pixels×8 pixels, and the area gradation representation is introduced as described in FIG. 13, the gradation representation and gradation stability which are to be made most of in the photograph image can be maintained.

Additionally, with respect to the photograph area which cannot constitute the sub-matrix of 8 pixels×8 pixels in FIG. 12, the filter and gamma table described in the first and second embodiments are selectively used, and the gradation representation is executed. Naturally, the character area in the same image is also processed by selectively using the filter and gamma table described in the first and second embodiments, and the sharpness can be held.

Therefore, by performing the image area separation by one pixel unit in the area, the image formation means exclusive for the character can be applied to the character area, the image formation means exclusive for the photograph can be applied to the photograph area, and differentiation can precisely be performed. Specifically, the image formation devoted for the sharpness is enabled for the character, and the image formation devoted for the gradation is enabled for the photograph. Moreover, when after the image area separation of one pixel unit, the photograph area is not formed of only one pixel, and the photograph area is continuous with the adjacent pixels, by performing not only the image formation of one pixel unit but also the image formation in the second predetermined area (sub-matrix unit), smoother gradation can be realized, and the image formation result superior in the gradation stability can be obtained.

Therefore, the accurate image area separation method can be provided with respect to the mixed image of the character and photograph images, or the character image on the photograph image, and the high sharpness of the character is compatible with the smooth gradation of the photograph.

As described above, the algorithm comprises: calculating the difference between the image signal of each pixel in the small area and the image signal of the pixel adjacent to each pixel in the small area or at least one of the longitudinally, laterally, and diagonally adjacent pixels; taking the absolute value with respect to the differences of all image signals in the small area; calculating the sum; comparing the sum with the predetermined value; considering one noticeable pixel to be the photograph area when the sum is less than the predetermined value; and considering one noticeable pixel to be the character area when the sum is equal to or more than the predetermined value. By this algorithm, in the above-described first to fourth embodiments, the image area separation in one pixel unit is accelerated and distinguishable, while in the conventional art the boundary between the small areas causes the unfavorable image deterioration as the false outline even in the small area.

Moreover, by disposing a plurality of filter tables as the means for adjusting the degree of the influence to the noticeable pixel from the peripheral pixel during the output in the image formation apparatus, and changing the filter table in the character area and photograph area judged by one pixel unit to attach importance to the relation with the peripheral pixel signal and to perform the filtering processing, the image signal of the noticeable pixel is modulated during the output in the image formation apparatus when one noticeable pixel is considered to be the photograph area, and the image output is performed without attaching importance to the relation with the peripheral pixel signal as compared with the photograph area during the output in the image formation apparatus when one noticeable pixel is considered to be the character area, the output is enabled for each pixel unit while attaching importance to the sharpness in the character area and to the gradation in the photograph area.

Furthermore, by disposing a plurality of gamma tables which are correspondence coefficient tables of the read image signal and output image signal as means for forcibly changing the image signal during the output in the image formation apparatus, and changing the gamma table in the character area and photograph area judged by one pixel unit so that the image signal of the noticeable pixel is modulated to forcibly change the pixel signal value during the output in the image formation apparatus when one noticeable pixel is considered to be the photograph area, and the image output is performed to reduce the forcible change amount as compared with the character area during the output in the image formation apparatus when one noticeable pixel is considered to be the character area, the character sharpness can further be enhanced.

Moreover, for the output in the image formation apparatus, by disposing a plurality of writing methods of the image formation apparatus, and changing the writing method in the image formation apparatus (image formation method) by each pixel unit in the character area and photograph area, further the character sharpness is compatible with the photograph gradation.

Furthermore, by detecting the continuous area from the distribution of the character area and photograph area as the judgment result of the pixel unit, performing no image formation of one pixel unit, and forming a plurality of areas into the sub-matrix to execute a screen processing (performing writing by the matrix unit over a plurality of pixels) when the photograph area is continuous in the read image, the gradation stability of the photograph area can further be realized.

Additionally, the image formation apparatus of the present invention may be of an electrophotographic system, ink jet system, sublimation system, and other systems.

Moreover, in the above-described first to fourth embodiments, after the image area separation of the read image into the character area or the photograph area, the image processing for each area is performed, and the image output is performed in the printer unit 206. However, after the image area separation of the read image into the character area or the photograph area, the constitution may comprise performing a suitable image processing on each area, and displaying the image on the displays such as not-shown cathode ray tube (CRT) and LCD.

Therefore, during the image output to the display with respect to the read image, the image output is enabled for each pixel unit while attaching importance to the sharpness for the photograph area and to the gradation for the photograph area.

Moreover, in the above-described first to fourth embodiments, with respect to the image read by the scanner unit 205 shown in FIG. 1, the image area separation judgment, image processing, and image formation are performed. However, with respect to the image read by other reading apparatuses (not shown) and inputted from the outside via the network 210, and the like, the image area separation judgment, image processing, and image formation described in the first to fourth embodiments may be performed in the constitution.

The constitution of a data processing program which is readable by the information processing apparatus of the present embodiment will be described with reference to a memory map shown in FIG. 14.

FIG. 14 is an explanatory view of the memory map of a storage medium for storing various data processing programs readable by the image formation apparatus according to the present embodiment.

Additionally, as not particularly shown, the information for managing a program group stored in a storage medium, such as version information and a person who prepares the information, are also stored. Additionally, the information dependent on a program reading side OS, such as an icon for identifying/displaying the program, are also stored.

Furthermore, the data belonging to various programs are also managed by the directory. Moreover, when the program or the data to be installed is compressed, a thawing program, and the like may also be stored in some cases.

The functions shown in FIGS. 6, 9 and 11 in the present embodiment may be fulfilled by a host computer in accordance with the program installed from the outside. Moreover, in this case, the information group including the program may be supplied to the output apparatus via the storage media such as CD-ROM, flash memory and floppy disk (FD) or from the external storage media via the network within the category of the present embodiment.

As described above, it goes without saying that the object of the above-described embodiment is also attained by supplying the storage media storing the software program code to realize the above-described function of the embodiment to the system or the apparatus, and reading and executing the program code stored in the storage medium by the system or the apparatus computer (or CPU or MPU).

In this case, the program code itself read from the storage medium realizes the inventive functions of the above-described various embodiments, and the storage medium storing the program code constitutes the present embodiment.

As the storage medium for supplying the program code, for example, a floppy disk, hard disk, optical disk, optical magnetic disk, CD-ROM, CD-R, magnetic tape, nonvolatile memory card, ROM, EEPROM, and the like can be used.

Moreover, it goes without saying that the embodiments include not only the realization of the above-described function by executing the program code read by the computer but also the realization of the above-described function by performing a part or the whole of the actual processing by the operating system (OS), and the like operating on the computer based on the instruction of the program code.

Furthermore, it goes without saying that the embodiments also include the realization of the above-described function by writing the program code read from the storage medium into a function expansion board inserted to the computer or a memory disposed in the function expansion unit connected to the computer, and performing a part or the whole of the actual processing by the CPU, and the like disposed in the function expansion board or the function expansion unit.

Additionally, the above-described embodiment may be applied to the system constituted of a plurality of apparatuses, or the device constituted of one apparatus. Moreover, needless to say, the object can also be attained by supplying the program to the system or the apparatus. In this case, it is possible to enjoy the effects of the above-described embodiments in the system or the apparatus when the storage medium storing the program represented by the software for attaining the above-described embodiment is read onto the system or the apparatus.

Furthermore, it is possible to enjoy the effects of the above-described embodiments in the system or the apparatus by downloading and reading the program represented by the software for attaining the above-described embodiment via the communication program from the database on the network.

As described above, since first calculation means calculates the sum of absolute values of differences of image signals between a predetermined pixel in a two-dimensional area including one noticeable pixel in a read image and a peripheral pixel of the predetermined pixel in the predetermined two-dimensional area (including a pixel adjacent to the predetermined one pixel, a pixel adjacent in a longitudinal direction, a pixel adjacent in a lateral direction, and a pixel adjacent in a slant direction), second calculation means calculates the sum of calculation results of the first calculation means with respect to the respective pixels in the predetermined two-dimensional area, and judgment means judges based on the calculation result of the second calculation means whether the noticeable pixel is the pixel in the photograph area or the pixel in the character area (when the calculation result of the second calculation means is smaller than a predetermined threshold value, one noticeable pixel is considered to be the photograph area, and when the calculation result of the second calculation means is equal to or more than the predetermined threshold value, one noticeable pixel is considered to be the character area), the image area separation judgment in one pixel unit of the read image can quickly and accurately be performed.

Moreover, since there is provided first control means for performing control to change an image processing (the image processing with respect to the noticeable pixel includes the image processing with respect to the noticeable pixel based on the image signal of the peripheral pixel of the noticeable pixel, and the image processing for changing output brightness with respect to the input brightness of the noticeable pixel) with respect to the noticeable pixel based on the judgment result of the judgment means, the image can be formed without generating the false outline in the boundary of the character and photograph areas and by attaching importance to the sharpness for each pixel unit of the character area and by attaching importance to the gradation in the photograph area.

Furthermore, since the first control means performs the image processing largely influenced from the peripheral pixel with respect to the noticeable pixel when the judgment means judges one noticeable pixel to be the photograph area, and performs the image processing little influenced from the peripheral pixel with respect to the noticeable pixel when the judgment means judges one noticeable pixel to be the character area, the image can be formed without generating the false outline in the boundary of the character area and the photograph area, and by attaching importance to the sharpness by each pixel unit for the character area and attaching importance to the gradation for the photograph area.

Additionally, since there are provided a plurality of filter tables for defining the image processing with respect to the noticeable pixel based on the peripheral pixel of the noticeable pixel, and the first control means changes the filter table to perform the image processing to the noticeable pixel based on the judgment result of the judgment means, a plurality of filters for modulating the influence degree of the image signal of the peripheral pixel of the noticeable pixel are switched, and the image can be formed without generating the false outline in the boundary of the character area and the photograph area and by attaching importance to the sharpness by each pixel unit for the character area and by attaching importance to the gradation for the photograph area.

Moreover, since the first control means performs the image processing with a small change amount of the output brightness to the input brightness of the noticeable pixel when the judgment means judges one noticeable pixel to be the photograph area, and performs the image processing with a large change amount of the output brightness to the input brightness of the noticeable pixel when the judgment means judges one noticeable pixel to be the character area, the image can be formed without generating the false outline in the boundary of the character area and the photograph area, and by attaching importance to the sharpness by each pixel unit for the character area and attaching importance to the gradation for the photograph area.

Furthermore, since there are provided a plurality of gamma conversion tables for defining the correspondence coefficient of the output brightness to the input brightness of the noticeable pixel, and the first control means changes the gamma conversion table to perform the image processing of the noticeable pixel based on the judgment result of the judgment means, by changing the gamma table for the character area and the photograph area by each pixel unit during the image output, the image can be formed without generating the false outline in the boundary of the character area and the photograph area and by attaching importance to the sharpness by each pixel unit for the character area and by attaching importance to the gradation for the photograph area.

Additionally, since there are provided a plurality of different image formation means, and second control means for changing the image formation means to control the image formation with respect to the noticeable pixel based on the judgment result of the judgment means, the writing method in the image formation apparatus is changed by each pixel unit for the character area and photograph area, and the image formation can be performed without generating the false outline in the boundary of the character area and the photograph area so that the character sharpness is compatible with the photograph gradation.

Moreover, since the second control means performs control to perform the image formation by first image formation means for representing shading in one pixel when the judgment means judges one noticeable pixel to be the photograph area and to perform the image formation by second image formation means for diffusing the error of noticeable pixel density and image formation density to the peripheral pixel of the noticeable pixel when the judgment means judges one noticeable pixel to be the character area, by changing the writing method in the image formation apparatus by each pixel unit for the character area and photograph area, the image formation can be performed without generating the false outline in the boundary of the character area and the photograph area so that so that the character sharpness is compatible with the photograph gradation.

Furthermore, there is provided detection means for detecting the continuous area of the photograph area based on the judgment result of the pixel unit, and when the detection means detects the continuous photograph area, the second control means performs control to perform the image formation by third image formation means for performing the image formation using the predetermined number of pixels in the continuous area of the photograph area as one unit. Therefore, when the photograph area is continuous in the read image, the image formation by each character unit is not performed, and the screen processing is performed by forming a plurality of areas into the sub-matrix, so that further gradation stability of the photograph area can be realized.

Moreover, by calculating the sum of absolute values of differences of image signals between one predetermined pixel in a predetermined two-dimensional area including one noticeable pixel in a read image and the peripheral pixel of the predetermined pixel in the predetermined two-dimensional area, calculating the sum of calculation results with respect to the respective pixels in the predetermined two-dimensional area, and judging based on the calculation result whether one noticeable pixel is the pixel in the photograph area or the pixel in the character area, the image area separation judgment by each pixel unit can quickly and accurately be performed.

Furthermore, since the image processing with respect to the noticeable pixel is changed based on the judgment result whether one noticeable pixel is the pixel in the photograph area or the pixel in the character area, the image can be formed without generating the false outline in the boundary of the character area and the photograph area and by attaching importance to the sharpness by each pixel unit for the character area and by attaching importance to the gradation for the photograph area.

Additionally, since the image formation with respect to the noticeable pixel is changed based on the judgment result whether one noticeable pixel is the pixel in the photograph area or the pixel in the character area, by changing the writing method by each pixel unit in the image formation apparatus for the character area and photograph area, the image formation can be performed so that the character sharpness is compatible with the photograph gradation.

Therefore, there are provided effects that the image area separation judgment by each pixel unit of the read image can quickly and accurately be performed, and that the image can be formed without generating the false outline in the boundary of the character area and photograph area so that the character sharpness is compatible with the photograph gradation.

What is claimed is:

1. An image formation apparatus for performing image formation based on an image, comprising:

first calculation means for calculating a sum of differences of image signals between one predetermined pixel in a two-dimensional area including one noticeable pixel in said image and a plurality of peripheral pixels of said predetermined one pixel in said predetermined two-dimensional area;

second calculation means for calculating the sum of calculation results of said first calculation means with respect to respective pixels in said predetermined two-dimensional area;

judgment means for judging based on a calculation result of said second calculation means whether said one noticeable pixel is a pixel in a photograph area or a pixel in a character area; and storage means for storing said differences used by said first calculation means for calculating a sum, wherein said differences stored in said storage means are repetitively used by said judgment means with respect to another two-dimensional area in said image different from said predetermined two-dimensional area.

2. An apparatus according to claim 1, wherein the plurality of peripheral pixels include a pixel adjacent to said predetermined one pixel, a pixel adjacent in a longitudinal direction, a pixel adjacent in a lateral direction, and a pixel adjacent in a slant direction.

3. An apparatus according to claim 1, wherein when said calculation result of said second calculation means is smaller than a predetermined threshold value, said judgment means judges one noticeable pixel to be the photograph area, and when the calculation result of said second calculation means is equal to or more than the predetermined threshold value, said judgment means judges one noticeable pixel to be the character area.

4. An apparatus according to claim 1, further comprising first control means for performing control to change an image processing with respect to said noticeable pixel.

5. An apparatus according to claim 4, wherein the image processing with respect to said noticeable pixel includes an image processing with respect to said noticeable pixel based on the image signal of the peripheral pixels, and an image processing for changing output brightness with respect to input brightness of said noticeable pixel.

6. An apparatus according to claim 4, wherein said first control means performs the image processing largely influenced from said peripheral pixel with respect to said noticeable pixel when said judgment means judges said one noticeable pixel to be the photograph area, and performs the image processing little influenced from said peripheral pixels with respect to said noticeable pixel when said judgment means judges said one noticeable pixel to be the character area.

7. An apparatus according to claim 4, further comprising a plurality of filter tables for defining the image processing with respect to said noticeable pixel based on the peripheral pixels, wherein said first control means changes said filter table to perform the image processing with respect to said noticeable pixel based on the judgment result of said judgment means.

8. An apparatus according to claim 4, wherein said first control means performs the image processing with a small change amount of the output brightness with respect to the input brightness of said noticeable pixel when said judgment means judges said one noticeable pixel to be the photograph area, and performs the image processing with a large change amount of output brightness with respect to input brightness of said noticeable pixel when said judgment means judges said one noticeable pixel to be the character area.

9. An apparatus according to claim 4, further comprising a plurality of gamma conversion tables for defining the correspondence coefficient of the output brightness with respect to the input brightness of said noticeable pixel, wherein said first control means changes said gamma conversion table to perform the image processing of said noticeable pixel based on the judgment result of said judgment means.

10. An apparatus according to claim 1, further comprising:

a plurality of different image formation means; and second control means for changing said image formation means to control the image formation with respect to said noticeable pixel based on the judgment result of said judgment means.

11. An apparatus according to claim 10, wherein said second control means performs control to perform the image formation by first image formation means for representing shading in one pixel when said judgment means judges said one noticeable pixel to be the photograph area, and to perform the image formation by second image formation means for diffusing the error of the density of said noticeable pixel and image formation density to the peripheral pixels when said judgment mean judges said one noticeable pixel to be the character area.

12. An apparatus according to claim 11, further comprising detection means for detecting a continuous area of said photograph area based on the judgment result of the pixel unit, wherein when said detection means detects a continuous photograph area, said second control means performs control to perform the image formation by third image formation means for performing the image formation using the predetermined number of pixels in the continuous area of said photograph area as one unit.

13. A control method of an image formation apparatus for performing image formation based on an image, comprising:

a first calculation step of calculating a sum of differences of image signals between one predetermined pixel in a predetermined two-dimensional area including one noticeable pixel in said image and a plurality of peripheral pixels of said predetermined one pixel in said predetermined two-dimensional area;

a second calculation step of calculating the sum of calculation results of said first calculation step with respect to respective pixels in said predetermined two-dimensional area;

a judgment step of judging based on the calculation result of said second calculation step whether said one noticeable pixel is the pixel in a photograph area or the pixel in a character area; and a storage step of storing said differences used in said first calculation step for calculating a sum;

wherein said differences stored in said storage step are repetitively used in the judgment step with respect to another two-dimensional area in said image different from said predetermined two-dimensional area.

14. A storage medium for storing a computer readable program for controlling an image formation apparatus to perform image formation based on an image, the computer readable program comprising:

a first calculation step of calculating a sum of differences of image signals between one predetermined pixel in a predetermined two-dimensional area including one noticeable pixel in said image and a plurality of peripheral pixels of said predetermined one pixel in said predetermined two-dimensional area;

a second calculation step of calculating the sum of calculation results of said first calculation step with respect to respective pixels in said predetermined two-dimensional area;

a judgment step of judging based on a calculation result of said second calculation step whether said one noticeable pixel is a pixel in a photograph area or a pixel in a character area; and a storage step of storing said differences used in said first calculation step for calculating a sum, wherein said differences stored in said storage step are repetitively used in the judgment step with respect to another two-dimensional area in said image different from said predetermined two-dimensional area.

15. An image processing method comprising steps of:

judging whether each image pixel is a character area or a photograph area;

performing a screening processing with respect to an area including a photograph area pixel adjacent to a pixel which is judged to be said photograph area as a judgment result; and storing results judged in said judging step;

wherein the results stored in said storing step are repetitively used in the screening processing with respect to an area different from said photograph area.

* * * * *

UNITED STATES PATENT AND TRADEMARK OFFICE
CERTIFICATE OF CORRECTION

PATENT NO. : 6,903,844 B1
DATED : June 7, 2005
INVENTOR(S) : Yuji Kamiya

It is certified that error appears in the above-identified patent and that said Letters Patent is hereby corrected as shown below:

Column 7,
Line 14, "point R(i, J)" should read -- point R(i, j) --.

Column 9,
Line 42, "sum d(i, J)" should read -- sum d(i, j) --; and
Line 45, "d1(i, J)" should read -- d1(i, j) --.

Column 12,
Line 67, "Judgment" should read -- judgment --.

Column 13,
Line 51, "table loll" should read -- 1011 --.

Signed and Sealed this

Twentieth Day of September, 2005

JON W. DUDAS
*Director of the United States Patent and Trademark Office*